United States Patent
Padawer et al.

(10) Patent No.: US 7,698,223 B2
(45) Date of Patent: Apr. 13, 2010

(54) PLUGGABLE FILE-BASED DIGITAL RIGHTS MANAGEMENT API LAYER FOR APPLICATIONS AND ENGINES

(75) Inventors: Andrew D. Padawer, Sammamish, WA (US); Katharine O. Holdsworth, Kirkland, WA (US); Miguel A. Claudio, Redmond, WA (US); Scott R. Shell, Kirkland, WA (US); William E. Stelzel, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 1100 days.

(21) Appl. No.: 11/111,651

(22) Filed: Apr. 21, 2005

(65) Prior Publication Data

US 2006/0242073 A1   Oct. 26, 2006

(51) Int. Cl.
*G06F 17/60* (2006.01)
*H04L 9/00* (2006.01)

(52) U.S. Cl. .................. 705/51; 705/52; 705/54; 705/57; 705/59

(58) Field of Classification Search ............... 705/51
See application file for complete search history.

(56) References Cited

U.S. PATENT DOCUMENTS

| | | | | |
|---|---|---|---|---|
| 7,096,249 B2 * | 8/2006 | Rajic et al. | ............ | 709/201 |
| 7,308,717 B2 * | 12/2007 | Koved et al. | ............ | 726/27 |
| 2003/0115147 A1 * | 6/2003 | Feldman et al. | ............ | 705/64 |
| 2003/0226012 A1 * | 12/2003 | Asokan et al. | ............ | 713/156 |
| 2004/0205333 A1 * | 10/2004 | Bjorkengren | ............ | 713/153 |
| 2004/0230806 A1 * | 11/2004 | Lisanke | ............ | 713/182 |
| 2005/0262568 A1 * | 11/2005 | Hansen et al. | ............ | 726/26 |
| 2006/0174347 A1 * | 8/2006 | Davydov et al. | ............ | 726/26 |

* cited by examiner

*Primary Examiner*—Andrew J Fischer
*Assistant Examiner*—C. Aaron McIntyre
(74) *Attorney, Agent, or Firm*—Woodcock Washburn LLP

(57) ABSTRACT

A pluggable file-based DRM (digital rights management) API (application program interface) layer for applications and engines. The invention defines a pluggable file-based DRM API layer such that mobile operators can choose to use any file-based DRM (FDRM) engine in their final product. An FDRM engine can be content agnostic (e.g., can range from an executable to a media file or ring-tone). In accordance with the invention, an application can become DRM aware by calling the novel file-based DRM APIs. Any FDRM engine can be plugged into the novel API layer such that applications can use the protected content. The API layer of the subject invention can be designed such that applications that are DRM aware by using the file-based DRM API layer can be DRM engine agnostic.

11 Claims, 15 Drawing Sheets

PLUGGABLE FILE-BASED DIGITAL RIGHTS MANAGEMENT API LAYER FOR APPLICATIONS AND ENGINES

TECHNICAL FIELD

This invention is related to computer systems and more particularly to a pluggable application program interface (API) that facilitates the use of digital rights management (DRM) content.

BACKGROUND OF THE INVENTION

Technological advances in digital media players have created a new market channel for distribution of copyrighted content (e.g., music, video, pictures) to users. For example, a user can download and/or share (e.g., transfer) digital content via the Internet. Oftentimes, this download and/or transferred content can violate copyright laws and rights of the owner of the work.

Recent developments in audio compression technologies have been directed to digital rights management (DRM) mechanisms in order to control unauthorized distribution of copyrighted content. In general, these audio compression technologies make it feasible to download quality audio from the Internet expeditiously while limiting access and/or sharing of the content to only authorized users.

These compression techniques have revolutionized music distribution. For example, an hour of near CD-quality audio can be downloaded in less than five minutes using a standard home computer. Accordingly, publishers have tried to cope with this phenomenon by introducing and enforcing copyright protections via the compression techniques. Overall, unauthorized downloading and/or sharing have become a major legal issue for the music industry.

DRM is a mechanism for protecting the copyrights of digital content that is distributed over the Internet. A DRM system can also include the accounting for paying royalties to the authors of the material. For example, in the music industry, a typical DRM system can provide a container format that includes album and track titles along with a set of rules that can enforce copyright compliance. Accordingly, software and hardware media players should support the rules order to play back the copyrighted material.

With respect to portable devices, there are several possible file-based DRM engines required by mobile operators around the world. Unfortunately, today, it is not determined which DRM format a device will be required until a mobile operator and OEM (original equipment manufacturer) commence working together and well after product development has concluded.

What is needed is a system that defines a FDRM (file-based DRM) API layer such that mobile operators can choose to use any file-based DRM engine in their final product. Further, a need exists for a file-based DRM engine that is content agnostic. In other words, the content can range from an executable to a media file or ring-tone.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The invention disclosed and claimed herein, in one aspect thereof, comprises a pluggable file-based DRM (digital rights management) API (application program interface) layer for applications and engines. As described supra, there are several possible file-based DRM (FDRM) engines required by mobile operators around the world. Unfortunately, the DRM format a device will be required to use is usually not determined until a mobile operator and OEM start working together and well after product development has concluded. This uncertainty makes it difficult for application developers to hard code a DRM API layer in advance. Accordingly, aspects of this invention define a pluggable FDRM API layer such that mobile operators can choose to use any FDRM engine in their final product.

It will be appreciated that a FDRM engine is content agnostic (e.g., content can range from an executable to a media file or ring-tone). The subject invention can facilitate an application to become DRM aware by calling the novel FDRM APIs. Any FDRM engine can be plugged into the novel FDRM API layer such that applications can use FDRM protected content. The FDRM API layer of the subject invention can be designed such that applications that are DRM aware using the FDRM API layer can be DRM engine agnostic.

In one aspect a FileDrmVerifyRightsEx API can take one additional parameter than FileDrmVerifyRights. The one additional parameter can be a filter identifier that allows applications to filter content based on its intended use. Rather than hard coding specific filter rules into applications, the subject invention can define a mechanism for the DRM engine to filter content. This provides both the ability to switch to a different DRM scheme as well as the ability of the OEM (original equipment manufacturer) or operator to customize the device.

In an aspect a globally unique identifier (GUID) can represent each filter and specify the intended use of the content (e.g., a ring tone). If the content has valid rights but does not meet the DRM engine defined criteria for using the content in the intended manner then FileDrmVerifyRightsEx can return failure (E_FDRM_NOTALLOWED). In another aspect, passing FDRMFT_NONE causes no filtering of the results. A filter not recognized by the DRM engine can treated as FDRMFT_NONE.

In yet another aspect thereof, an artificial intelligence component is provided that employs a probabilistic and/or statistical-based analysis to prognose or infer an action that a user desires to be automatically performed.

To the accomplishment of the foregoing and related ends, certain illustrative aspects of the invention are described herein in connection with the following description and the annexed drawings. These aspects are indicative, however, of but a few of the various ways in which the principles of the invention can be employed and the subject invention is intended to include all such aspects and their equivalents. Other advantages and novel features of the invention will become apparent from the following detailed description of the invention when considered in conjunction with the drawings.

DETAILED DESCRIPTION OF THE INVENTION

Figure 1:
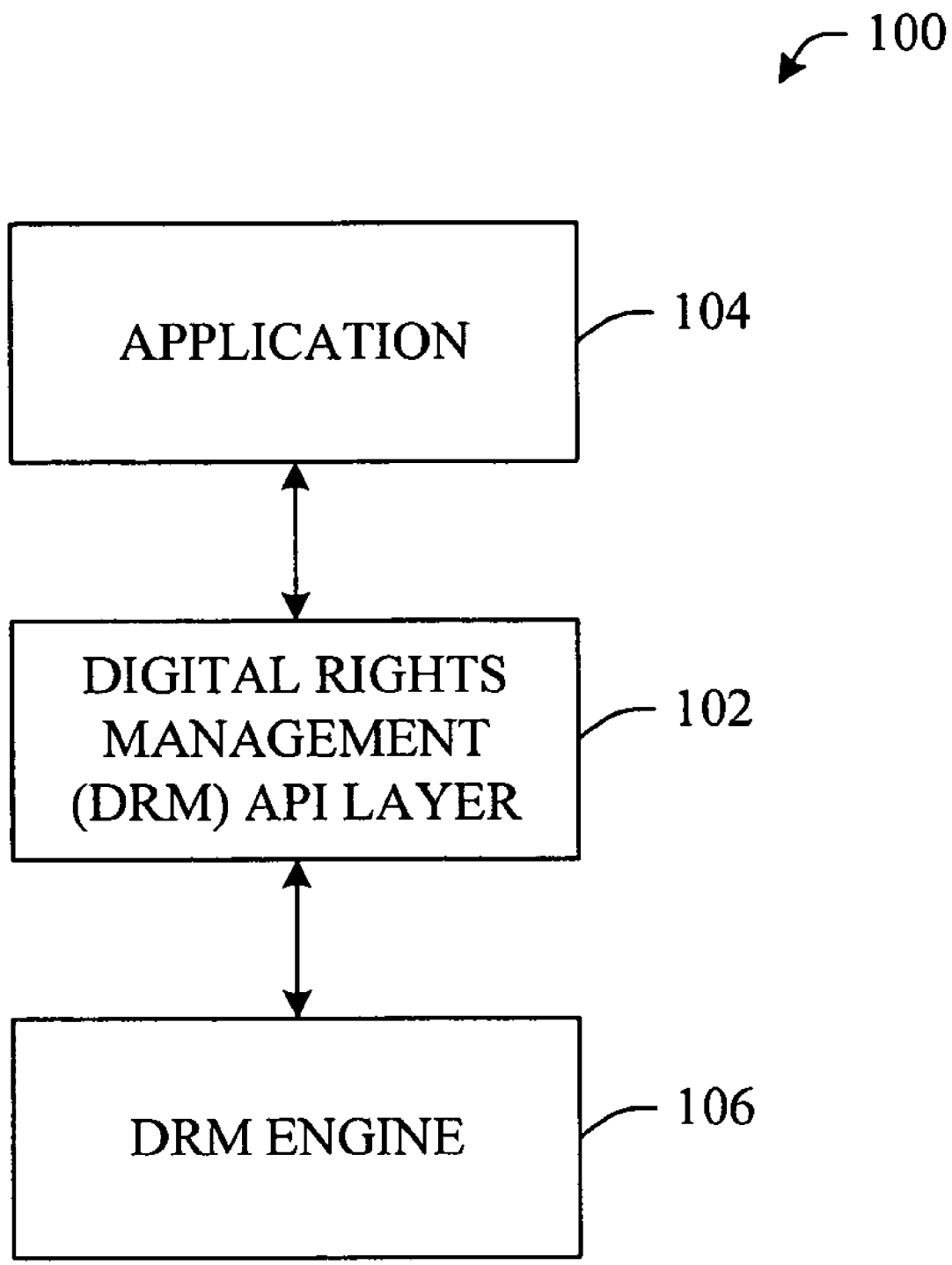
FIG. 1 illustrates a general component block diagram of a system that facilitates making an application DRM (digital rights management) aware in accordance with an aspect of the subject invention.

The invention is now described with reference to the drawings, wherein like reference numerals are used to refer to like elements throughout. In the following description, for purposes of explanation, numerous specific details are set forth in order to provide a thorough understanding of the subject invention. It may be evident, however, that the invention can be practiced without these specific details. In other instances, well-known structures and devices are shown in block diagram form in order to facilitate describing the invention.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Following is a discussion a novel application program interface (API) layer that can host exemplary user interfaces (UIs) in order to address digital rights management (DRM) content. It is to be appreciated that the exemplary UIs shown and described in this specification are intended to provide context to invention with respect to DRM enabling applications by providing examples of how a centralized DRM engine UI can be incorporated into a feature. Furthermore, it is not mandatory to follow the exact UI flows illustrated herein if it does not suit individual applications so long as DRM rules are adhere to. Still further, it is to be appreciated that the API naming conventions disclosed herein are not intended to limit the scope and/or functionality of the invention in any way. Other APIs with the same or similar functionality can be employed using a completely different naming convention.

The following terms are used throughout the description, the definitions of which are provided herein to assist in understanding various aspects of the subject invention.

Prompt Based Rights refers to a general term for content that has count rights or the start of interval based rights associated therewith. For example, mobile operators may require a user to be notified prior to using content with count or start of interval-based rights. Because the operator requirements may be unclear, such registry keys can be provided to allow the operator to turn on or off the count or interval based rights notifications. In the case where the operator chooses to suppress the prompted based rights use notifications, content can be treated as non-prompted based rights content. In general, the count and interval based rights will be referred to as 'prompt based rights' since they may require a user prompt prior to rendering content.

Forward-Locked refers to content that is locked to the device and cannot be forwarded for use on another device.

Referring initially to FIG. 1, system 100 in accordance with an aspect of the invention is shown. Generally, the system 100 includes a DRM API component 102 that enables an application 104 to communicate with a DRM engine 106. In order to enable application 104 to be DRM aware, the application 104 can employ the DRM API layer 102 when calling the DRM engine 106. In other words, application 104 does not call the DRM engine 106 directly. It will be appreciated that if an application 104 is using the DRM API layer 102, the application will not compromise the DRM content or use it in any way other than in accordance with the DRM rules and restrictions imposed via the DRM engine 106.

The DRM APIs 102 can act as a bit funnel for DRM content between the DRM engine 106 and DRM aware application 104. As stated previously, it will be understood that, in accordance with the invention, all DRM protected files can retain the same file extension and storage location infrastructure as its unprotected counterpart. In other words, the invention can make application 104 DRM aware by using (e.g., plugging) the DRM API 102. DRM awareness includes using the DRM engine 106 and related UIs (not shown) to inform users of content use status. DRM awareness further includes allowing application 104 to use DRM protected content with active rights and likewise preventing the application 104 from saving altered copies of any protected content.

Furthermore, DRM awareness can prevent application 104 from forwarding or sending content locked to the device. It will be understood that, in another aspect, application 104 can also facilitate use of DRM protected content stored on removable storage cards. As previously stated, it is to be understood that DRM API layer 102 illustrated in FIG. 1 can be representative of a set of APIs including 1 to N disparate APIs, where N is an integer. These 1 to N disparate APIs will be described in greater details infra and can be referred to individually or collectively as DRM API layer 102.

Upon making the application 104 DRM aware, the application 104 will abide by all the applicable DRM use rules set forth by the DRM engine component 106. For example, the application 104 can refer to the appropriate DRM engine 106 restrictions and/or operator requirements for more detailed use definitions and rules. Application 104 can work as usual if a DRM client is not included in the build. By way of example, an aspect of the invention can prevent DRM protected content from being saved or transferred (e.g., synced or sent) via inbox, calendar, ActiveSync, Bluetooth, Infrared, contacts, notes, removable storage cards, or the like.

In order to provide context to the invention, the following exemplary scenarios are provided. It is to be appreciated and understood that the scenarios that follow are not intended to limit the invention in any way. Of course, other scenarios exist that can employ novel features and functionality of the subject invention. Moreover, although the scenarios that follow are directed to "smartphone" implementations, it is to be understood and appreciated that additional scenarios can exist whereby other devices are employed. For example, other devices can include, but are not limited to include, cell phones, personal data assistants (PDAs), pocket personal computers (PPCs), desktop computers, laptop computers or the like.

A first scenario is directed to downloading content via a smartphone. Suppose Kate downloads DRM protected content from her operators' web site onto her smartphone. In accordance thereto, a UI is displayed that tracks the download progress. When completed, the UI notifies Kate of the successful download and gives her the choice to open the content. Kate chooses not to open it. In this example, the content remains on her device in the event she turns it off. It will be appreciated that, if the content cannot be used, a user notification can inform Kate that the content cannot be used and was not saved on the device.

Figure 2:
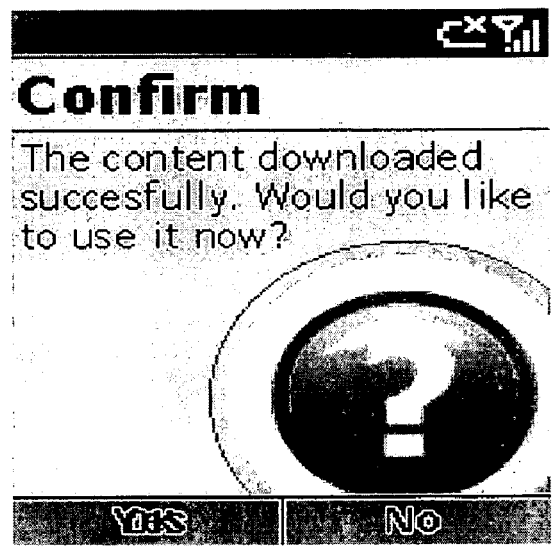
FIG. 2 illustrates two exemplary user interfaces (UIs) that facilitate notifying a user of download status in accordance with an aspect.
Figure 2:
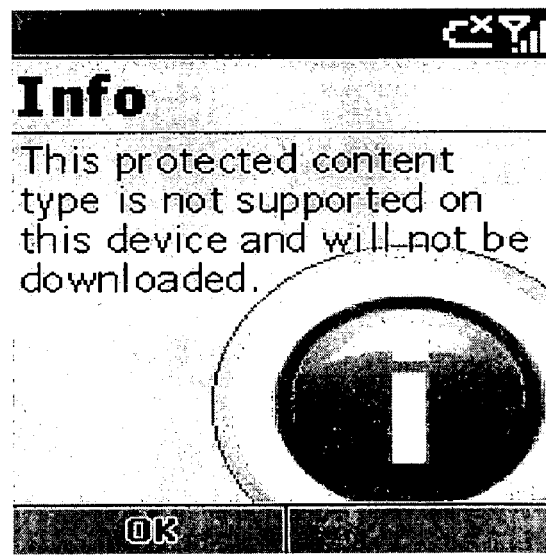

FIG. 2 illustrates two exemplary UIs that can be employed with reference to the first scenario. As illustrated, exemplary UI 202 can be employed to notify a user (e.g., Kate) that the desired content has downloaded successfully. Additionally, the UI 202 can inquire if the content is to be used immediately. On the other hand, UI 204 can be employed to notify the user (e.g., Kate) that the content (e.g., ring tone) selected cannot be used on the present device and therefore will not be downloaded.

Another scenario is directed to the use of any active DRM protected content, for example, a ring tone. Suppose Kate wants to select a new ring tone for her smartphone. Accordingly, she scrolls through her ring tones in the sounds spin box and selects a desired tone. In this example, she chooses a ring tone that she downloaded from her operators' website. Kate pauses on the desired ring tone, hears a short preview then presses done. As a result, the ring tone is now set and her smartphone rings using the chosen ring tone. Although this scenario is directed to a ring tone, it is to be understood that this scenario is similar for any DRM aware application using protected content.

Figure 3:
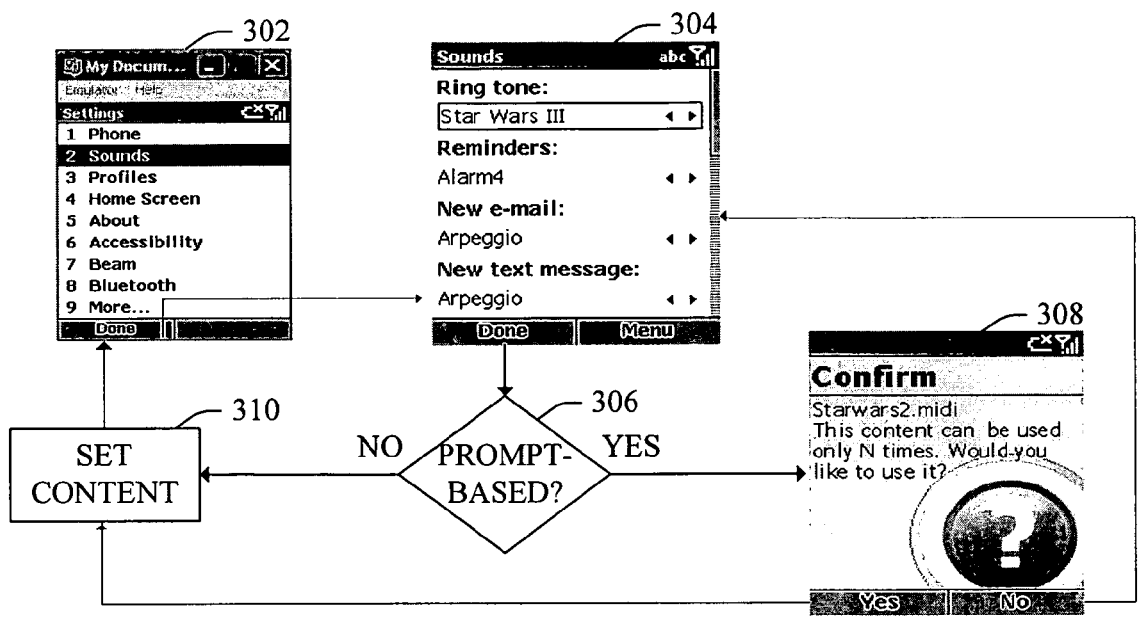
FIG. 3 is a UI flow diagram of using content in accordance with an aspect of the invention.

FIG. 3 illustrates this scenario whereby the user (e.g., Kate) selects to use the ring tone. For example, UI 302 can be displayed to facilitate selection of a "sound" content file. Once "DONE" is selected via the UI 302; the user can be prompted with UI 304, which facilitates selection of a particular "sound" file. After a desired sound file is selected at 304, a determination is made if the selection contains prompt-based rights at 306. If the selection does contain prompt-based rights, UI 308 can be displayed to advise of the particular prompt-based rights as well as to query the user if a desire exists to use the prompt-based rights. If answered in the affirmative, the content can be set at 310. If not, the selection UI 304 can be rendered. If a determination is made at 306 that the selection does not contain prompt-based rights, the content can be set at 310 as illustrated.

Another example is directed to the use of any inactive DRM protected content, for example, a ring tone. As in the previous scenario, suppose Kate wants to select a new ring tone for her smartphone. She scrolls through her ring tones in the sounds spinbox and pauses on a desired ring tone. However, in this instance, there is no sound preview and she presses done. The UI notifies Kate that the desired ring tone is no longer activated and gives her the option of connecting to a web site to acquire new rights. Kate elects to buy new rights and is connected to the rights issuer website. While she is waiting for the rights, the default ring tone is used. Once the new rights arrive, she is notified via a SMS (short message service) text message. Accordingly, Kate's smartphone now rings using the desired ring tone. It is to be appreciated that the content (e.g., ring tone) can be protected such that Kate is unable to renew the rights. In this case, she will be notified that the content cannot be used.

Figure 4:
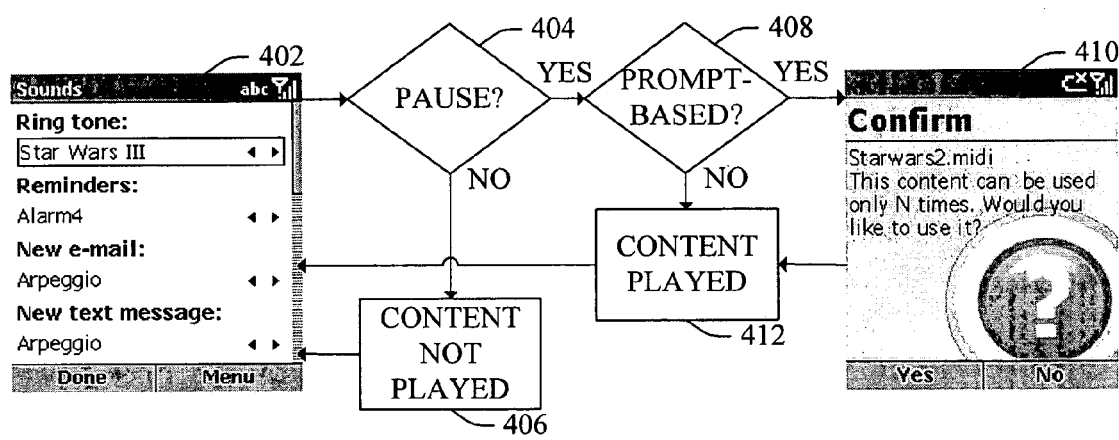
FIG. 4 is a UI flow diagram of previewing content in accordance with an aspect of the invention.

FIG. 4 illustrates a UI flow diagram of previewing content in accordance with an aspect of the invention. More particularly, content (e.g., ring tone) can be selected via the exemplary UI 402. At 404, a user can elect to pause on the content. If pause is not selected, the system returns to the UI of 402 to enable another selection. If paused, at 408, the system can determine if prompt-based rights exist. At 410, the details of the prompt-based rights can be conveyed to the user whereby the user can confirm desire to continue. Once the user confirms to continue at 410, the content is played at 412. As well, if at 408 it is determined that prompt-based rights do not exist, the system can play the content at 412 as illustrated.

Figure 5:
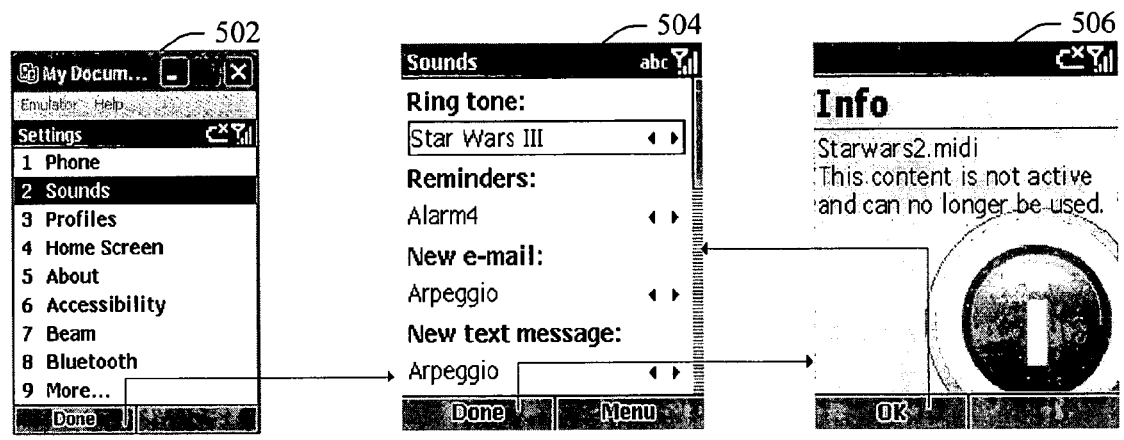
FIG. 5 is a UI flow diagram of use of content with expired rights (no rights renewal) in accordance with an aspect of the invention.

Turning now to the UI flow diagram of FIG. 5, a UI flow diagram of use of content with expired rights (no rights renewal) in accordance with an aspect of the invention is shown. Essentially, at 502, a UI is presented to the user to facilitate selection of the type of content (e.g., sound) to download. At 504, a UI can be launched to enable a user to select a particular file of the selected type. The UI of 506 can advise the user of expired content. It will be appreciated, as described herein, additional UIs can be presented to enable renewal or access to additional rights to use the content.

Figure 6:
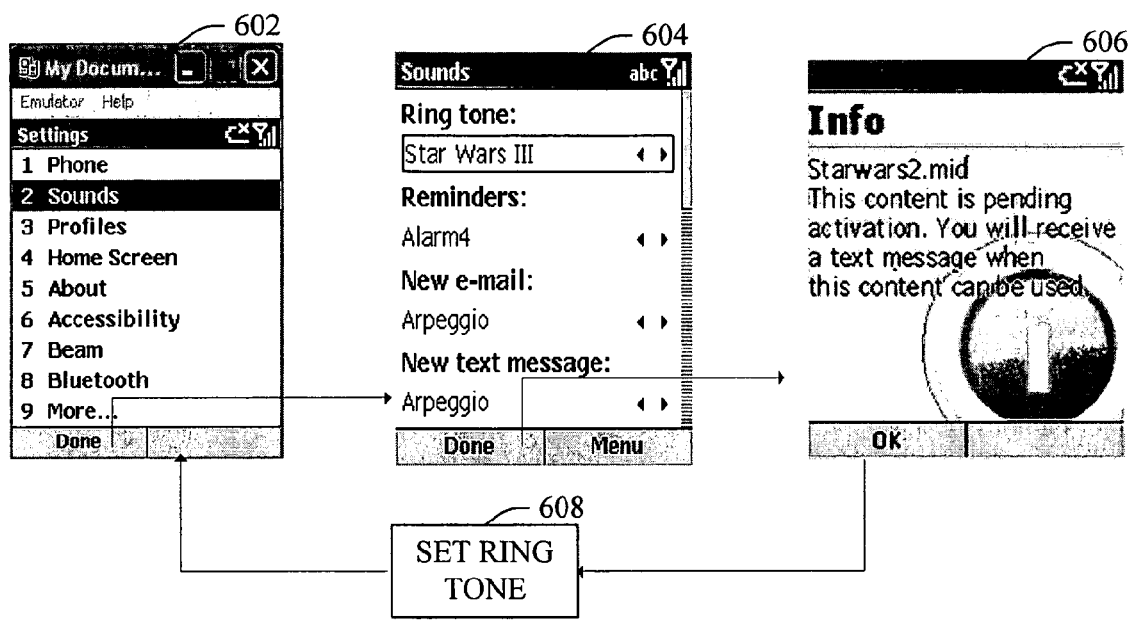
FIG. 6 is a UI flow diagram of use of content pending activations in accordance with a disclosed aspect.

FIG. 6 illustrates a UI flow diagram of use of content pending activations in accordance with a disclosed aspect. As shown, at 602 and 604, UIs can be rendered that enable a user to select the type and specific file to download and/or open. At 606, a UI can be rendered that notifies a user that the selected content is pending activation. Accordingly, the system can notify the user via a text message once rights are in place. The content is set at 608 and will automatically become available to the user once rights are in place.

Figure 7:
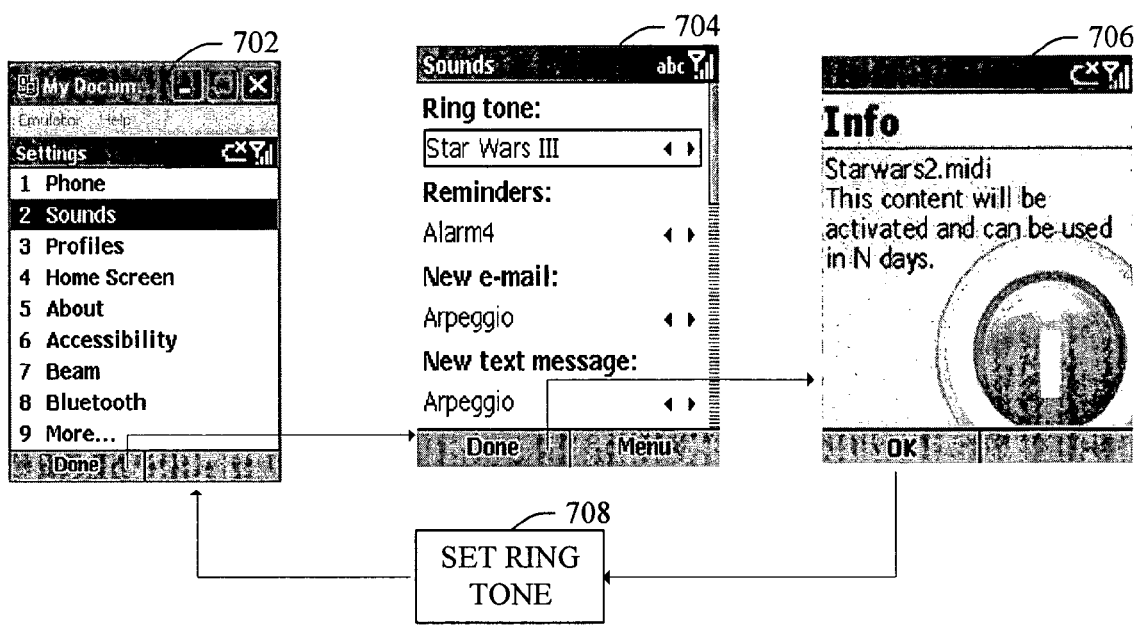
FIG. 7 is a UI flow diagram of use of content that is active but not yet current in accordance with an aspect of the invention.

Similar to FIG. 6, FIG. 7 is a UI flow diagram of use of content that is active but not yet current in accordance with an aspect of the invention. In accordance therewith, at 702 and 704, the type of content can be selected together with a specific file name to download and/or open. At 706, a UI can be presented that notifies a user that the selected content will be activated will be available in N days, where N is an integer. At 708, the content can be set and will automatically become available once the appropriate rights are in place.

Yet another scenario is directed to receiving forward-locked protected content via MMS. Kate receives a message containing forward-locked content (e.g., image, sound). She can employ the content as she would any unprotected content. Kate tries to forward the message with the content to a friend; however, the UI notifies her that the content cannot be forwarded. Although, the content cannot be forwarded, Kate can save the image to her device with no modifications. She deletes the original message and can view use the content again so long as rights allow.

Still another example is directed to sending protected content. Suppose Kate composes a message and inserts a forward-locked sound. The UI notifies her that this content cannot be sent from her device. Kate then chooses another sound. The UI notifies her that the recipient will be required to obtain rights prior to using the content. Kate previews the message. If rights are current and are not prompt based, Kate sees the preview of the attachment. If rights are current and prompt based, before previewing, the UI notifies Kate that her rights status will adjust. If the rights have expired, Kate will be given the opportunity to buy new rights if that option is available. In this case, the content cannot be previewed until new rights are received. When Kate is satisfied with her message, she chooses to send it.

In operation, applications can explicitly call the DRM APIs to access protected content. In one aspect, a user attempting to use content with expired renewable rights will be prompted with a UI that enables the user to reactivate rights. In another aspect, a user attempting to use content that has expired non-renewable rights will be notified that the content cannot be used. In still another aspect, a user attempting to use content with prompt based rights will cause a UI to appear asking the user if they want to alter the status (e.g., reduce count or start interval) of their rights if this UI is not suppressed by the operator setting a registry key.

In accordance with the invention, an API (or set of APIs) can allow applications to be written to support a variety of file-based digital rights management (FDRM) technologies without understanding the intricacies of the DRM schema. In accordance with an aspect, a common UI for DRM related tasks is supplied by an engine that allows the application to take advantage of engine specific DRM features without understanding them. Additionally, if the UI is not suitable for a particular scenario, it can be suppressed by the application call to the FDRM API layer.

Essentially, the subject invention wraps a DRM engine in a generic set of DRM APIs thus enabling non-DRM aware applications to become DRM aware by calling the generic set of DRM APIs. It will be understood that, in accordance with an aspect, all DRM protected files can retain the same file extension and storage location infrastructure as its unprotected counterpart. Additionally, a user can rename protected content and make multiple copies (e.g., backup) of protected content. DRM content can be stored in a protected format on a removable storage card or desktop and, if DRM rights permit, the content can be accessed directly from these storage locations.

As described supra, the subject invention is directed to a novel set of APIs that define an interface to DRM content on device (e.g., mobile device). This set of APIs can wrap any DRM solution in a form that allows applications to use DRM content without changes. It will be understood that this novel feature allows the use of any DRM scheme. Devices without DRM protection can still use these same APIs.

Figure 8:
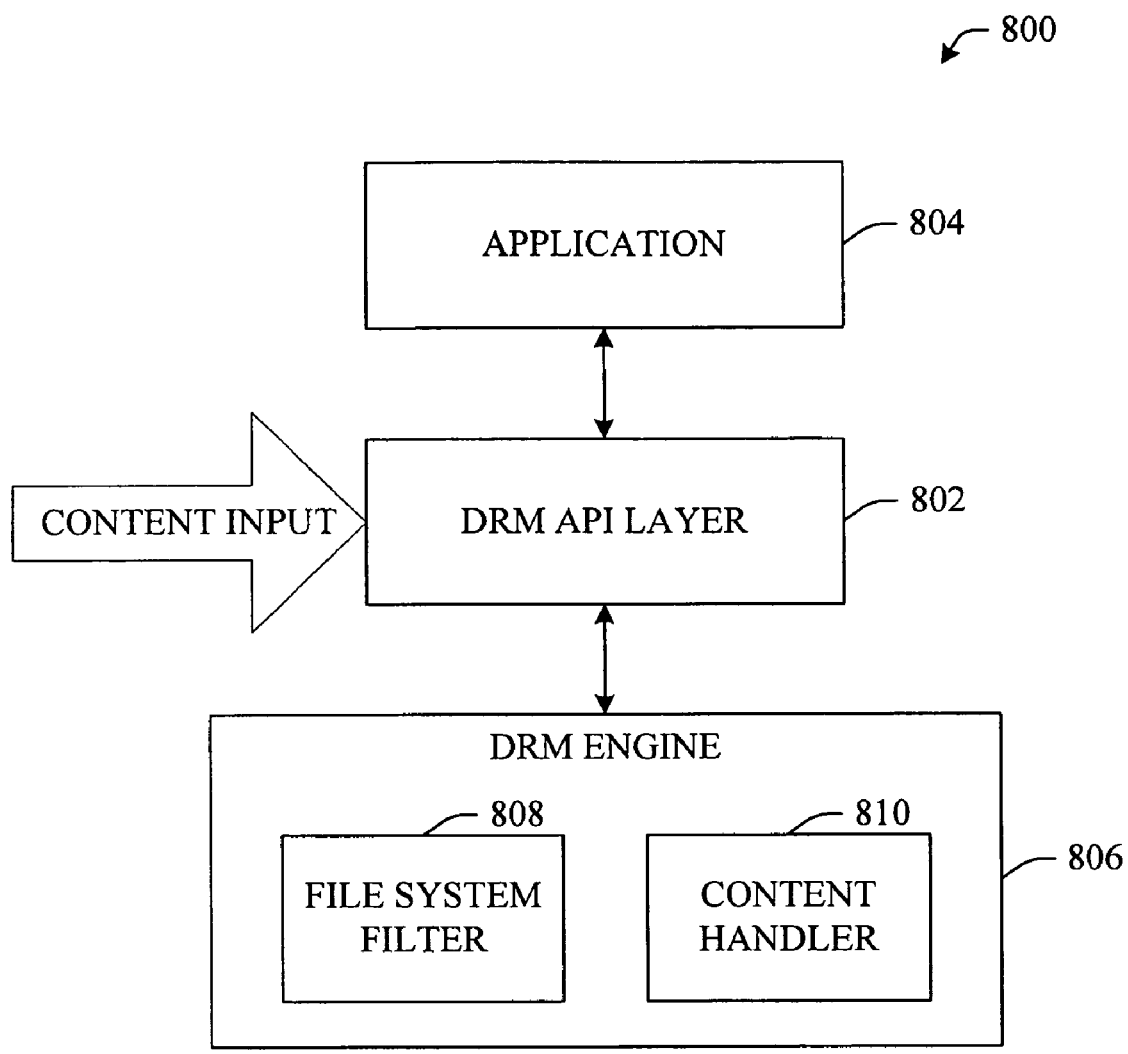
FIG. 8 is a general block diagram that illustrates an exemplary aspect that employs a file system filter and content handler while making an application DRM aware in accordance with a disclosed aspect.

Referring now to FIG. 8, a system 800 can generally include a DRM API layer 802, an application 804 and a DRM engine 806. As illustrated, the DRM engine 806 can include a file system filter 808 and a received content handler 810. The API can be a stub that calls into the DRM engine API implementation layer if present on a device. If there is no DRM engine the stub provider can work as if all content has all available rights.

In one aspect, content can be stored on the device in the same location and with the same filename it would have had if it was not protected content. Protected content can be stored in such a way that content sharing across multiple devices is impossible without the other devices acquiring rights for that content. In accordance with the invention, it is possible to move or copy content to other locations on the same device, store content on removable storage cards, and to back up content. An application 804 can employ the file APIs to work with files, however files opened with a CreateFile call instead of a DRM_CreateFile call will return "garbage" when read. These calls will be better understood upon a reading of the discussion that follows. The invention can also block writes to files containing DRM protected content.

In accordance with the invention, DRM protected content will have a set of rights associated with it that can define how the device can use content. For instance, an image can have rights that allow a user to display the image but not to forward the image to another user. This API 802 employs content that is not DRM protected as having all possible rights.

Limits on how long or how often the content can be used are also possible. For example, limitations can be placed on the use of a sound file. For instance, a sound file can be limited to a predefined number of plays (e.g., 10 times), a play time period (e.g., only until March 1, for two weeks from the time first used) or a combination thereof (e.g., or only 10 times until March 1). Once these limited rights have been exhausted, it may be possible for the user to acquire additional rights. An application 804 or DRM engine 806 can initiate acquisition of new rights when handling the error caused by expired rights in accordance with the invention.

In one aspect, the DRM engine 806 can be responsible for providing most of the user interaction for displaying or renewing rights associated with a content protected object. For this purpose, some calls may take a long time to complete, as an interaction with a remote rights management server (not shown) may be required.

In general, application 804 does not create protected content. An application 104 that receives protected content can call a content handler 810, which stores the content in the device file system and stores the content rights in a rights store. The DRM engine 802 can supply this content handler 810. Although FIG. 8 illustrates the content handler 810 included within the DRM engine 802, it is to be appreciated that the content handler 810, and file system filter 808 can be external components from the DRM engine 806. The rights associated with the content may not be included with the received content. For example, in a wireless aspect, the rights associated with the content can be received separately using a WAP (wireless application protocol) push. As well, it will be appreciated that the content and/or the rights associated therewith can be stored remote from the device. The DRM engine 806 can be responsible for receiving these rights, storing them in the rights store, and notifying the user of the rights.

Figure 9:
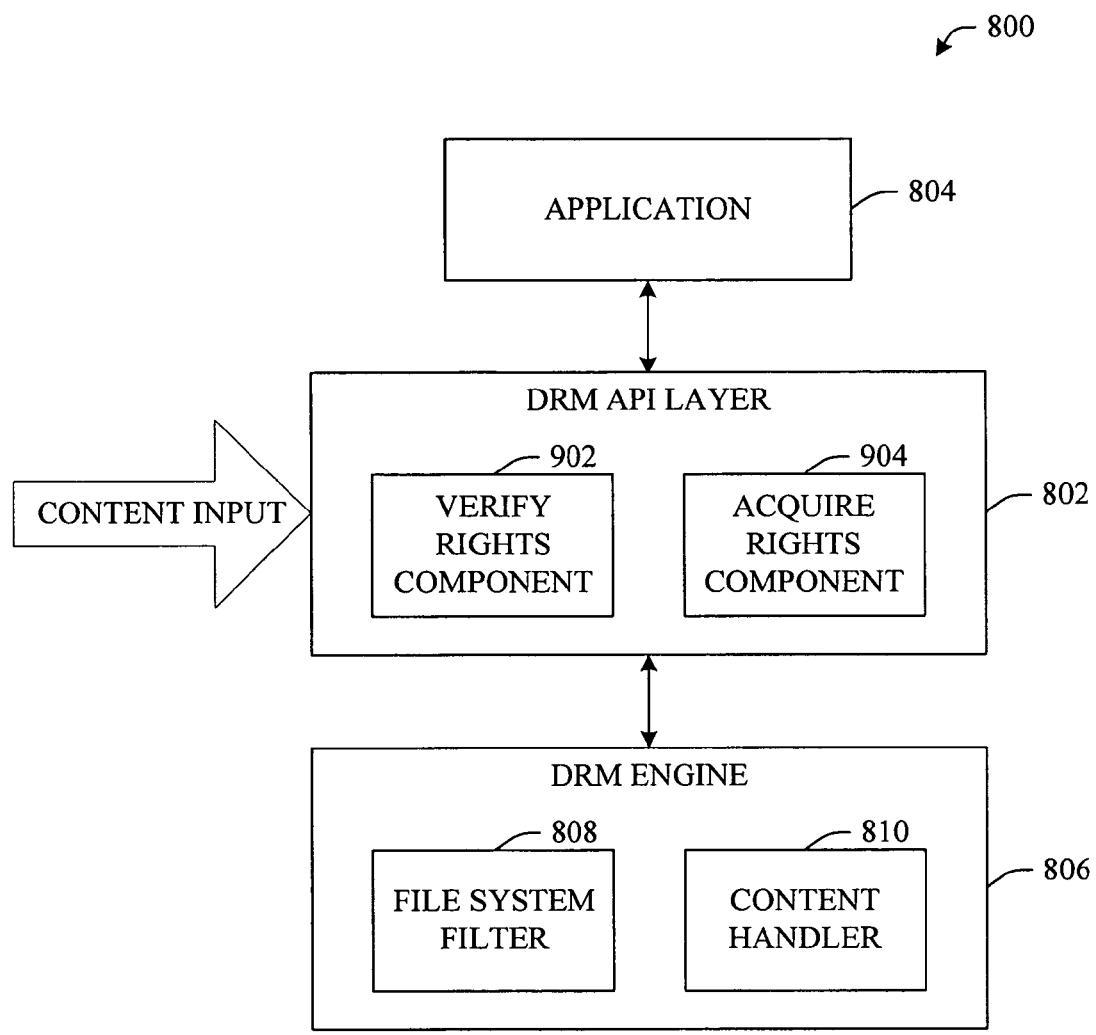
FIG. 9 is a general block diagram that employs a verify rights component and an acquire rights component in accordance with a disclosed aspect.

Referring now to FIG. 9, the DRM API layer 802 can include a verify rights component 902 and an acquire rights component 904. The verify rights component 902 (e.g., FileDrmVerifyRightsEx API) can take a filter identifier parameter that facilitates application 804 to filter content based on an intended use of content. Rather than hard coding specific filter rules into the application 804, the invention provides a mechanism (e.g., verify rights component 902) for the DRM engine 806 to filter content. This mechanism provides both the ability to switch to a different DRM scheme as well as the ability of the original equipment manufacturer (OEM) and/or operator to customize the device.

In one aspect, the invention employs global unique identifiers (GUIDs), which represent each filter, and specifies the intended use of the content (e.g., a ring tone). If the content has valid rights but does not meet the DRM engine 806 defined criteria for using the content in the intended manner then the file system filter 808 returns failure (e.g., E_FDRM_OTALLOWED) to the verify rights component 902 (e.g., FileDrmVerifyRightsEx). It is to be understood that passing FDRMFT_NONE can cause no filtering of the results. A filter not recognized by the DRM engine is treated as FDRMFT_ONE.

With continued reference to FIG. 9, the acquire rights component 904 can be provided to facilitate a user to obtain necessary rights to use the content. As well, the acquire rights component can facilitate the user to renew cancelled and/or expired rights.

In one aspect, implementations of the DRM engine 806 can export the functions implementing these APIs (e.g., 802) from a dynamic link library (dll) by ordinal using the following mappings:

| | |
|---|---|
| FileDrmIsDRM | @1 NONAME |
| ** RESERVED ** | 2 |
| FileDrmCreateFile | @3 NONAME |
| FileDrmCreateForwardableContent | @4 NONAME |
| FileDrmNotifyEnable | @5 NONAME |
| FileDrmNotifyDisable | @6 NONAME |
| FileDrmShowLicenseInfo | @7 NONAME |
| FileDrmHandleError | @8 NONAME |
| FileDrmRenewRights | @9 NONAME |
| FileDrmGetMetric | @10 NONAME |
| FileDrmVerifyRights | @11 NONAME |
| FileDrmCommitRights | @12 NONAME |
| FileDrmDeleteFile | @13 NONAME |
| FileDrmStoreContent | @14 NONAME |
| ** RESERVED for use by existing DRM engines ** | 15-24 |
| FileDrmVerifyRightsEx | @25 NONAME |
| ** RESERVED for future API extensions ** | 26-74 |

The functions that implement the APIs 802 set forth in the above table will be each described in greater detail infra.

Figure 10:
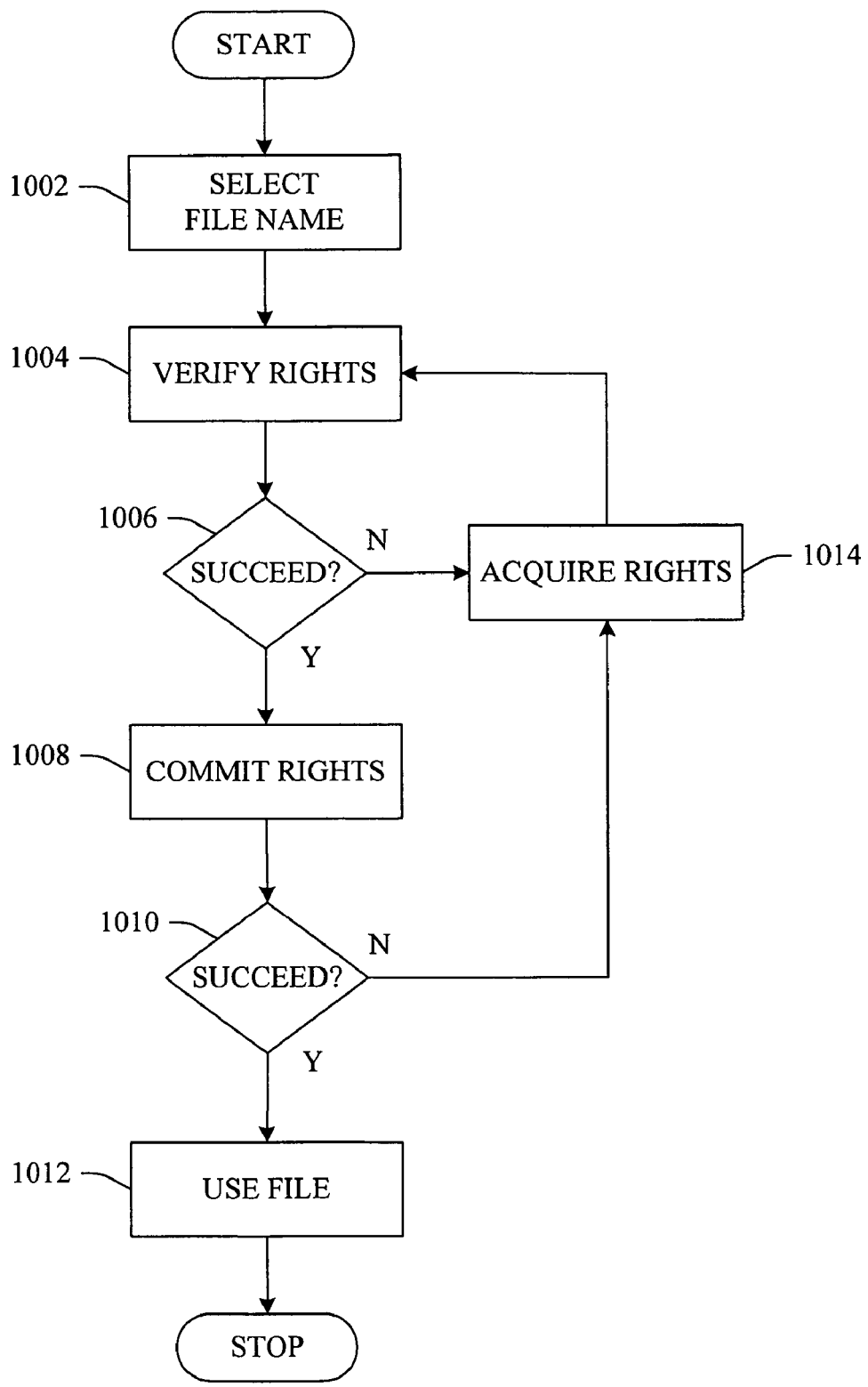
FIG. 10 illustrates an exemplary flow chart of procedures to verify and/or acquire rights of a selected file in accordance with a disclosed aspect.

FIG. 10 illustrates a methodology of implementing APIs in accordance with the invention. While, for purposes of simplicity of explanation, the one or more methodologies shown herein, e.g., in the form of a flow chart, are shown and described as a series of acts, it is to be understood and appreciated that the subject invention is not limited by the order of acts, as some acts may, in accordance with the invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the invention.

With reference now to FIG. 10, at 1002 a file name is selected. At 1004, rights are verified. It will be appreciated that, in addition to verifying the existence of rights, the validity of any rights can also be verified at 1004. A determination is made at 1006 if the rights are sufficient to utilize the content of the file selected at 1002.

If the rights are sufficient, the rights are committed at 1008. The success of committing the rights can be verified at 1010. If successful, the file can be used at 1012. On the other hand, if the rights are not sufficient to enable use of the file content at 1006 or the commit rights fails at 1010, appropriate rights can be acquired at 1014. Once acquired, the rights are verified at 1004.

If the rights are not successfully verified at 1006, some DRM API error codes prompt one or more DRM engine UIs in accordance with the instant error code. For example, in one aspect, an error code that reflects rights license is pending (e.g., E_FDRM_LICENSEPENDING) prompts an appropriate DRM engine UI. In another example, an error upon attempting to forward content without forwarding rights (e.g., E_FDRM_NOFORWARDRIGHTS) will prompt the DRM engine to initiate corresponding UIs. In still another example, if rights have not been obtained or are no longer valid an error code will be generated (e.g., E_FDRM_NOTALLOWED) thus effecting the DRM engine to launch the appropriate UIs. Other error codes can be handled by the calling application with no UI.

Figure 11:
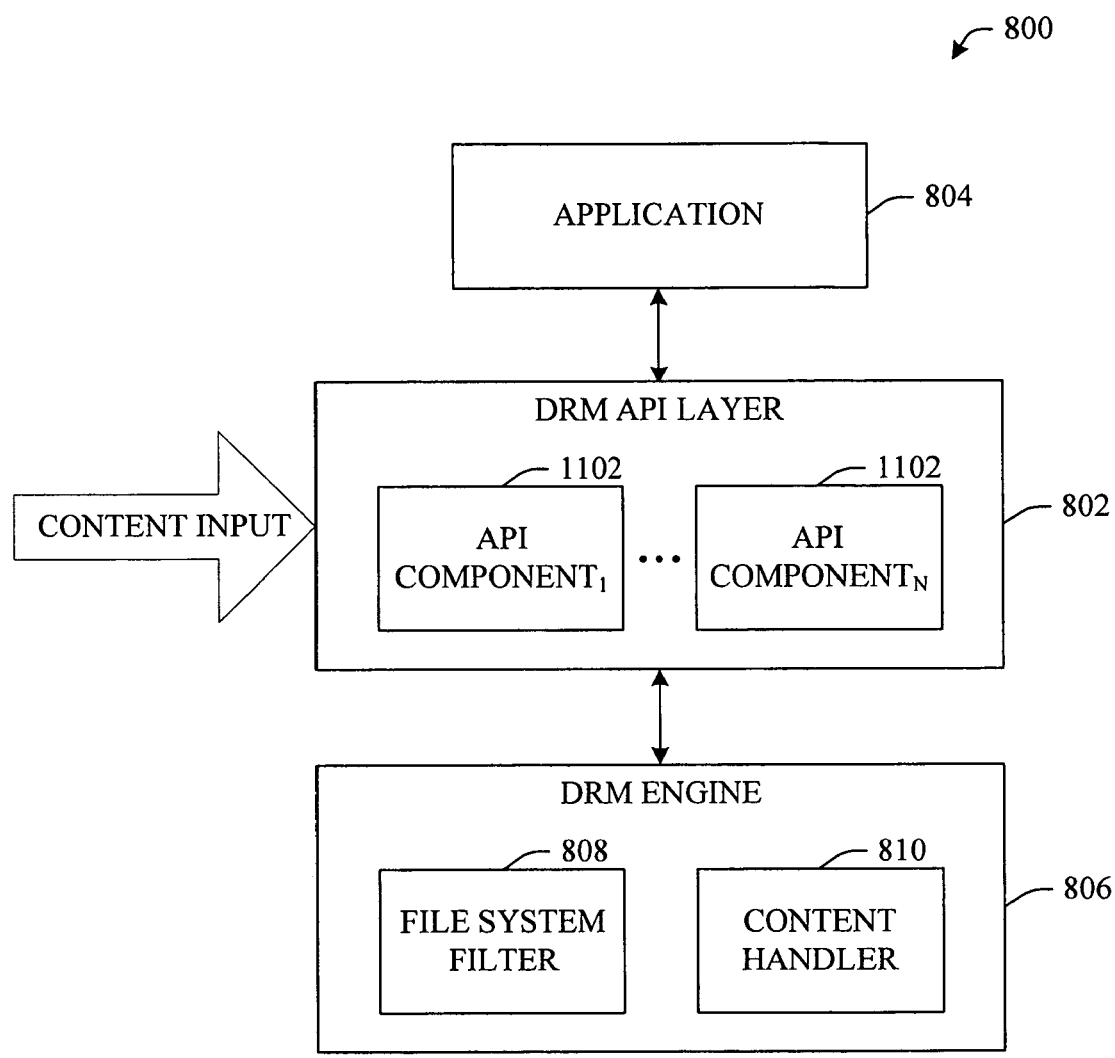
FIG. 11 is a general block diagram that illustrates a DRM API (application program interface) layer having multiple API components in accordance with an aspect.

As described supra, API layer component 802 can include 1 to N disparate APIs, where N is an integer. FIG. 11 illustrates that 1 to N disparate DRM APIs can be referred to individually or collectively as DRM API component 1102.

Following is a discussion of an exemplary set of DRM APIs 1102 in accordance with an aspect of the invention. It is to be appreciated that these exemplary DRM APIs 1102 are included to provide context to the invention and is not intended to limit the invention in any way. Following is the exemplary list of DRM APIs 1102 for managing FDRM content in accordance with the invention. As well, for each API listed, a brief description of the API functionality is listed in the right column of the table below.

| API (1102) | FUNCTION |
|---|---|
| FileDrmIsDRM | Determine if an object is FDRM protected |
| FileDrmCreateFile | Open a file containing FDRM content |
| FileDrmCreateForwardableContent | Create forwardable version of content |
| FileDrmNotifyEnable | Enable FDRM provider notifications |
| FileDrmNotifyDisable | Disable FDRM provider notifications |
| FileDrmShowLicenseInfo | Show rights associated with an object |
| FileDrmHandleError | Display error UI/try to correct problem |
| FileDrmRenewRights | Renew the rights for a FDRM object |
| FileDrmGetMetric | Retrieve FDRM metric |
| FileDrmVerifyRights | Verify that an object can be used |
| FileDrmCommitRights | Commit the rights used by an object |
| FileDrmDelete | Delete an object and rights |
| FileDrmStoreContent | Store protected content on the device |

Each of these exemplary APIs 1102 for dealing with FDRM content is described in greater detail below. The description that follows is directed to an exemplary DRM API layer. It is to be appreciated that other aspects can exist that include all or a subset of the APIs described infra. These alternate aspects are intended to be included within the scope of the disclosed invention as well as the claims attached hereto.

Figure 12:
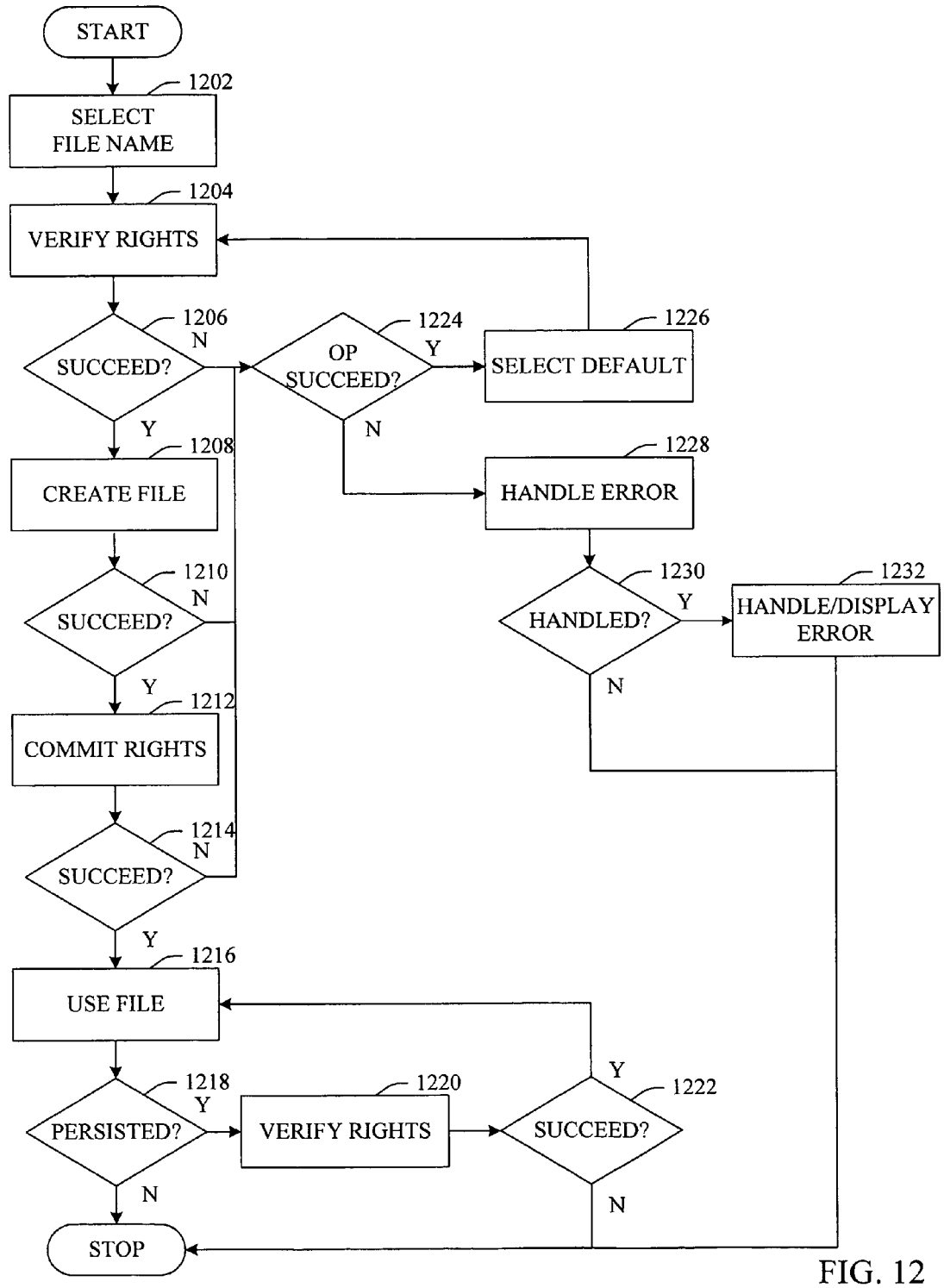
FIG. 12 illustrates an exemplary flow chart of procedures to verify DRM rights, acquire DRM rights and handle errors in accordance with a disclosed aspect.

Referring to a discussion of error codes, as described supra, there are a number of error codes, which can effect launching a DRM engine UI that can prompt user input. FIG. 12 illustrates a methodology of employing protected content in accordance with an aspect of the invention. As well, FIG. 12 illustrates exemplary error codes that can prompt DRM engine action (e.g., UI).

At 1202 a file to use is selected. Next, at 1204, a verify rights API is called. In one aspect, the verify rights API can be a FileDrmVerifyRights API. A determination of success is made at 1206. It will be appreciated that the methodology can included a file inspection API such as FileDrmIsDRM which can determine if the file contains DRM protected content.

If at 1206 a determination is made that the rights are verified, a create file API can be called. In the example, a FileDrmCreateFile API can be called whereby the file that contains the FDRM content can be opened. At 1210 a determination is made if successful. If successful in opening the file, rights can be committed at 1212. In order to do so, a FileDrmCommitRight API is employed to commit the rights used by the selected object.

Once the rights are committed at 1212, a determination is made if the if committing the rights was successful. If so, the file can be used at 1216. A determination is made if the file is persisted at 1218. If it is determined that the file is persisted, the rights are verified at 1220. For example, the FileDrmVerifyRights API can be called to verify the rights. Accordingly, another success determination is made at 1222. If successful, the methodology returns to 1216 to use the file. If not successful at 1222, a stop block is reached.

Continuing with the example and returning to 1206, a determination of rights verification is made from 1204. If determined not successful at 1206, the system determines if the operation should succeed at 1224. If the operation should succeed at 1224, a default filename is selected at 1226. Once selected at 1226, the system can return to 1204 to verify the rights.

However, if at 1224, a determination is made that the operation does not have to succeed, a handle error API 1228 (e.g., FileDrmHandleError) can be called. In accordance therewith, an error UI can be displayed to attempt to correct the problem. At 1230, a determination is made if the problem has been rectified. If not, a stop block is reached. If the error is handled, error information can be displayed at 1232.

In the exemplary aspect, some of the DRM API error codes require DRM engine UI interaction. For example, E_FDRM_ICENSEPENDING, E_FDRM_NOTALLOWED and E_FDRM_NOFORWARDRIGHTS require UI interaction. All other error codes in the example can be handled by calling the application with no UI.

It is to be appreciated that each decision block (e.g., succeeded, persisted, handled) can generate error codes. Turning first to a discussion of scenarios where an API call succeeds. In one aspect, the API call can succeed but no FDRM provider is installed. In this situation, a code such as S_FDRM_NOPROVIDER can be generated. In another example, an API call can succeed but, the passed in the object is not FDRM protected. A code such as S_FDRM_NOTDRMOBJECT can be generated.

Other exemplary error codes can be as follows:

E_FDRM_FILEDELETED—Object did not have rights and could not be re-activated. User choose to delete the object.

E_FDRM_LICENSEPENDING—Object cannot be used now but there is an outstanding request for some type of rights renewal.

E_FDRM_CANCELLED—User chose not to use object with prompt-based rights.

E_FDRM_NOTDRMOBJECT—API call failed since the passed in object was not FDRM protected.

E_FDRM_NOTALLOWED—Requested operation is not allowed for this object or object does not have sufficient rights to be used.

E_FDRM_NOFORWARDRIGHTS—Object does not have rights to be forwarded.

E_FDRM_NONOTIFY—Object was never registered for notifications.

E_FDRM_NOPROVIDER—API call failed since no FDRM provider was installed.

E_FDRM_UNKNOWNMETRIC—Unknown metric type requested from FDRM_GetMetric.

E_FDRM_ERRORNOTHANDLED—Error could not be handled by FDRM_HandleError.

Returning to the exemplary API layer, names can be defined for results of HRESULT_FROM_WIN32 as follows:

```
#define E_INSUFFICIENT_BUFFER
HRESULT_FROM_WIN32(ERROR_INSUFFICIENT_BUFFER)
#define E_FILE_NOT_FOUND
HRESULT_FROM_WIN32(ERROR_FILE_NOT_FOUND)
#define FACILITY_FDRM          FACILITY_ITF
```

The HRESULT codes can be started to avoid conflicting with COM-defined codes:

```
#define CODE_OFFSET                     0x0200
#define S_FDRM_NOTDRMOBJECT             MAKE_HRESULT(SEVERITY_SUCCESS,
FACILITY_FDRM, (CODE_OFFSET + 3))
#define S_FDRM_NOPROVIDER               MAKE_HRESULT(SEVERITY_SUCCESS,
FACILITY_FDRM, (CODE_OFFSET + 7))
#define E_FDRM_FILEDELETED              MAKE_HRESULT(SEVERITY_ERROR,
FACILITY_FDRM, (CODE_OFFSET + 0))
#define E_FDRM_LICENSEPENDING           MAKE_HRESULT(SEVERITY_ERROR,
FACILITY_FDRM, (CODE_OFFSET + 1))
#define E_FDRM_CANCELLED                MAKE_HRESULT(SEVERITY_ERROR,
FACILITY_FDRM, (CODE_OFFSET + 2))
```

-continued

```
#define E_FDRM_NOTDRMOBJECT          MAKE_HRESULT(SEVERITY_ERROR,
FACILITY_FDRM, (CODE_OFFSET + 3))
#define E_FDRM_NOTALLOWED            MAKE_HRESULT(SEVERITY_ERROR,
FACILITY_FDRM, (CODE_OFFSET + 4))
#define E_FDRM_NOFORWARDRIGHTS       MAKE_HRESULT(SEVERITY_ERROR,
FACILITY_FDRM, (CODE_OFFSET + 5))
#define E_FDRM_NONOTIFY              MAKE_HRESULT(SEVERITY_ERROR,
FACILITY_FDRM, (CODE_OFFSET + 6))
#define E_FDRM_NOPROVIDER            MAKE_HRESULT(SEVERITY_ERROR,
FACILITY_FDRM, (CODE_OFFSET + 7))
#define E_FDRM_UNKNOWNMETRIC         MAKE_HRESULT(SEVERITY_ERROR,
FACILITY_FDRM, (CODE_OFFSET + 8))
#define E_FDRM_ERRORNOTHANDLED       MAKE_HRESULT(SEVERITY_ERROR,
FACILITY_FDRM, (CODE_OFFSET + 9))
```

Continuing with the example, bitmasks for various rights associated with content can be defined:

```
#define FDRRF_PLAY        0x00000001    // Play audio/video
content
#define FDRRF_DISPLAY     0x00000002    // Display images
#define FDRRF_EXECUTE     0x00000004    // Execute
applications
#define FDRRF_PRINT       0x00000008    // Print content
#define FDRRF_FORWARD     0x00000010    // Content can be
forwarded
```

Bitmask flags to control the FileDrmGetForwardContent API can be defined as follows:

```
#define FDRCF_BARE         0x00000001   // Bare file
#define FDRCF_MIMEENCODED  0x00000002   // Add needed
                                           MIME
headers
```

Bitmask flags to control FileDrmVerifyRights and FileDrmCommitRights APIs can be defined. FDRVF_NOUI can suppress all UI display. This allows the calling application to ensure that this call will not block waiting for user input. FDRVF_NORENEW does not attempt to update the rights associated with a piece of content (either through user interaction or automatically).

FDRVF_VERIFY_CONTINUE can be specified when FileDrmCommitRights has been called and has returned success for a piece of content. As well, the consuming application of the content can still be consuming the same instance of the content but needs to re-verify rights. For example, a media player might begin playing a song but be interrupted by a phone call. Once the phone call completes, the media player can call FileDrmVerifyRights to verify that it still has rights to continue playing that content. This flag can allow content to continue being used even if the applicable rights are no longer valid. For instance, if the content has restrictions on the number of times it can be used and the usage count went to zero in the last call to FileDrmCommitRights then the user should still be allowed to use that content until is has been completely consumed. These bitmask flags can be defined as follows:

```
#define FDRVF_NOUI         0x00000001   // Do not show
any UI
#define FDRVF_NORENEW      0x00000002   // No rights
renewal
#define FDRVF_VERIFY_CONTINUE  0x00000004  // Verify
continued use of content
```

Status values returned from FileDrmVerifyRights and FileDrmVerifyRightsEx can be as follows:

```
#define FDRVS_USER_CAN_UPDATE   0x00000001  // Right
invalid but user can update
#define FDRVS_UPDATE_PENDING    0x00000002  // A rights
update is pending
#define FDRVS_EXPIRABLE         0x00000004  // Rights are
currently valid but can expire
```

Bitmask flags to control FileDrmHandleError can be specified. The following can be set by calling the application:

```
#define FDRHF_NOCORRECT    0x00000001   // Do not try to
correct error
```

Next, examples that can be set by FileDrmHandleError are shown:

```
#define FDRHF_RETRY          0x00010000  // Calling app
should retry op.
#define FDRHF_RIGHTSPENDING  0x00020000  // Rights update
pending
```

Turning now to a discussion of the FDRMMETRIC API. Metric types can be retrieved using FileDrmGetMetric call. In one aspect, all time intervals are returned in milliseconds. For example:

```
typedef enum tagFDRMMETRIC
{
    FDRM_METRIC_PREVIEW_TIME,    // allowed preview time
    FDRM_METRIC_DELAY_TIME,      // delay before prompting to
use rights
    FDRM_METRIC_REVERIFY_TIME    // How often to re-verify
rights when using
                                 // content in a continuous
manner
} FDRMMETRIC;
```

As described supra, FilDrmVerifyRightsEx can take a filter identifier parameter that facilitates application 804 to filter content based on an intended use of the content. By way of example, filter identifiers for FileDrmVerifyRightsEx can be as follows:

```
// {5A3A54DD-209F-48e6-91DB-6A49F9238413}
DEFINE_GUID(FDRMFT_NONE, 0x5a3a54dd, 0x209f, 0x48e6, 0x91,
0xdb,
0x6a, 0x49, 0xf9, 0x23, 0x84, 0x13);
// {35AB44BA-B7D0-4548-9C3B-6864E9D08281}
DEFINE_GUID(FDRMFT_RINGTONES, 0x35ab44ba, 0xb7d0,
0x4548, 0x9c,
0x3b, 0x68, 0x64, 0xe9, 0xd0, 0x82, 0x81);
// {B7EADA14-F373-4e12-BF17-0722B64362D5}
DEFINE_GUID(FDRMFT_WALLPAPER, 0xb7eada14, 0xf373,
0x4e12, 0xbf,
0x17, 0x7, 0x22, 0xb6, 0x43, 0x62, 0xd5);
```

The FileDrmIsFDRM function can quickly determine if an object is FDRM protected. In doing so, the following arguments can be employed:

```
// Arguments:
//     [IN] pszFile - The fully qualified path to the file being
        checked, including the file extension.
//     [OUT] pfDRM - A pointer to a BOOL variable which be set to
        TRUE if the object
pointed to by the file is DRM protected; FALSE otherwise.
```

The function is free to return any HRESULT and the application should use the SUCCEEDED/FAILED macros to check the results. In addition, the following HRESULT codes may be returned.

```
//     [SUCCESS]
//         S_FDRM_NOPROVIDER
//             The value pointed to by pfDRM will be FALSE in this
                case.
//         S_FDRM_NOTDRMOBJECT
```

The value pointed to by pfDRM will be FALSE in this case. This allows an application to display an indication that content is DRM protected.

```
            HRESULT FileDrmIsDRM (LPCTSTR pszFile,
                          PBOOL pfDRM);
```

The function FileDrmCreateFile can facilitate a DRM-aware application to open a DRM protected object. This function can be used in place of the standard CreateFile API.

```
// Arguments:   See CreateFile( ) for full details of each parameter.
//     [IN] pszFileName -The fully qualified path to the file to
        be opened
//     [IN] dwDesiredAccess - Type of access to the object.
//     [IN] dwShareMode - Share mode for the object.
//     [IN] lpSecurityAttributes - Ignored; set to NULL
//     [IN] dwCreationDisposition - How to handle existing/new files
//     [IN] dwFlagsAndAttributes - File attributes for the file.
//     [IN] hTemplateFile - Ignored; set to NULL
//     [OUT] phFile - Pointer to a handle variable that will hold
        the file handle if the call is successful.
```

In addition to the HRESULT return code the value pointed to by phFile should be set to INVALID_HANDLE_VALUE if an error is returned. The function is free to return any HRESULT and the application should use the SUCCEEDED/FAILED macros to check the results. The following HRESULT codes may be returned.

```
//     [SUCCESS]
//         S_FDRM_NOPROVIDER
//             The returned rights structure will allow for all rights.
//         S_FDRM_NOTDRMOBJECT
//             The returned rights structure will allow for all rights.
// Side effects:   File can be opened or created as appropriate.
// Notes: Use CloseHandle to close the handle returned from this function.
```

This FileDrmCreateFile function is to be used in place of the standard CreateFile API by applications that are "FDRM Aware." With some exceptions as detailed below, the function behaves the same way as CreateFile and returns any error that occurs during the call as the HRESULT created by HRESULT_FROM_WIN32 called on the value returned from GetLastError( ). When the following conditions are true the FileDrmCreateFile works differently than CreateFile:

Case 1: Opening FDRM content for use.
1. An FDRM provider is installed.
2. The file being created already exists and contains FDRM protected content.
3. dwDesiredAccess is set to GENERIC_READ
4. dwCreationDisposition is set to OPEN_EXISTING In this case FileDrmCreateFile opens the file in such a way that subsequent calls to ReadFile will return the unencrypted version of the files content such that it can be used by the application.

Case 2: Attempting to open FDRM content for write access.
1. An FDRM provider is installed.
2. The file being created already exists and contains FDRM protected content.
3. dwDesiredAccess is set to GENERIC_WRITE In this case FileDrmCreateFile will fail to open the file (to prevent applications from inadvertently overwriting protected content).

Case 3: Attempting to delete/truncate FDRM content.
1. An FDRM provider is installed.
2. The file being created already exists and contains FDRM protected content.
3. dwCreationDisposition is set to CREATE_ALWAYS or TRUNCATE_EXISTING.

In this case FileDrmCreateFile will fail to open the file (to prevent applications from inadvertently overwriting protected content).

```
HRESULT FileDrmCreateFile    (LPCTSTR pszFileName,
                              DWORD dwDesiredAccess,
                              DWORD dwShareMode,
                              LPSECURITY_ATTRIBUTES
lpSecurityAttributes,
                              DWORD dwCreationDisposition,
                              DWORD dwFlagsAndAttributes,
                              HANDLE hTemplateFile,
                              PHANDLE phFile);
```

The FileDrmCreateForwardableContent function can create a file containing a DRM protected object in a way that allows it to be forwarded to another user.

```
// Exemplary Arguments are shown below:
//     [IN] pszFileName - The fully qualified path to the file to
         be forwarded.
//     [IN] dwFlags - Flags to control the format of the generated
         document. See the
DRCF_* flags for defined values.
//     [IN] pszOutputFile - The fully qualified path for a file to
         hold the document
// Return Values:
```

The function is free to return any HRESULT and the application should use the SUCCEEDED/FAILED macros to check the results. In addition, the following HRESULT codes may be returned.

```
//     [FAILURE]
//         E_FDRM_NOPROVIDER
//         E_FDRM_NOTDRMOBJECT
//         E_FDRM_NOFORWARDRIGHTS
// Side effects: A new file is created holding the DRM protected content
```

Applications that want to forward content can use this FileDrmCreateForwardableContent API to package format in such a way that it can be sent to another device.

```
HRESULT FileDrmCreateForwardableContent    (LPCTSTR
                                            pszFileName,
                                            DWORD dwFlags,
                                            LPCTSTR
                                            pszOutputFile);
```

Referring now to a discussion of the FileDrmNotifyEnable API, the purpose of this API is to register an application with the DRM provider for updates when updated rights are received on the device. Arguments in accordance therewith can be as follows:

```
//     [IN] pszFileName - Fully qualified path to the file to
         receive notifications
//     [OUT] pszValueName -Pointer to a buffer to be filled
         with the name of a registry
DWORD value that will be updated when the rights associated with
the object change. The returned string should always be
terminated with a NUL character as long as cchValueLen is >= 1.
//     [IN] cchValueLen - Length of the pszValueName buffer.
         Using a buffer of size
MAX_PATH can be sufficient. Passing in a smaller buffer will cause
this function to return E_INSUFFICIENT_BUFFER if the buffer is too
small to hold the returned string (including the NUL terminator).
```

The function is free to return any HRESULT and the application should use the SUCCEEDED/FAILED macros to check the results. In addition, the following HRESULT codes may be returned.

```
//     [FAILURE]
//         E_FDRM_NOPROVIDER
//         E_FDRM_NOTDRMOBJECT
//         E_INSUFFICIENTBUFFER
```

On success the psValueName can be filled in with the name of a registry value that can be monitored by the application. A new registry value may have been created in the registry. These values will be under the key HKEY_CURRENT_USER\FDRM\Monitor. It will be appreciated that notification of expiration of time or count based rights may not be supported.

An application that needs to know when a rights renewal has arrived can use this function along with the RegistryNotifyxxxx functions to receive notifications from the DRM provider. The DRM provider will take the passed in filename and generate the name of a registry value that will be used as a proxy for the file. The calling application can then register for registry notifications using this value. When the DRM provider changes the rights store it will also write the new rights value (using the DRRF_* values) to that registry value.

The DRM provider will reference count calls to FileDrmNotifyEnable and FileDrmNotifyDisable and only stop updating and remove the registry value when the reference count reaches zero. As well the DRM provider will monitor processes and remove all outstanding references to the notification upon process exit. Registrations by multiple processes or threads within a single process that refer to the same filename should return the same registry value name to be monitored. The provider will also monitor calls to DeleteFile and remove any outstanding notifications when a FDRM protected file is deleted.

```
HRESULT FileDrmNotifyEnable    (LPCTSTR pszFileName,
                                LPTSTR pszValueName,
                                DWORD cchValueNameLen);
```

The FileDrmNotifyDisable API allows the DRM provider to stop receiving notifications of changes to the rights associated with a file.

```
// Arguments:
//     [IN] pszFileName - Fully qualified path to the file that
         the application no longer
      wants to receive notifications for.
```

The function is free to return any HRESULT and the application should use the SUCCEEDED/FAILED macros to check the results. In addition, the following HRESULT codes may be returned.

```
//     [FAILURE]
//         E_FDRM_NOPROVIDER
//         E_FDRM_NOTDRMOBJECT
//         E_FDRM_NONOTIFY
```

See the description of FileDrmNotifyEnable supra for a description of this function.

HRESULT FileDrmNotifyDisable (LPCTSTR pszFileName);

The FileDrmShowLicenseInfo API can facilitate showing the rights associated with a DRM protected object.

```
// Arguments:
//     [IN] hwndParent - Handle to the window that owns any UI
         elements (windows,
      dialog boxes, or message boxes) displayed by this API.
```

```
//      [IN] pszFileName - The path of the file to show license
             information for.
```

The FileDrmShowLicenseInfo function is free to return any HRESULT and the application should use the SUCCEEDED/FAILED macros to check the results. In addition, the following HRESULT codes may be returned.

```
//      [SUCCESS]
//          S_FDRM_NOPROVIDER
//          S_FDRM_NOTDRMOBJECT
```

A dialog is presented to the user showing the rights associated with the file. This function returns when the user dismisses the dialog.

```
HRESULT FileDrmShowLicenseInfo    (HWND hwndParent,
                                   LPCTSTR pszFileName);
```

The FileDrmHandleError function can facilitate displaying an error dialog to the user when an error occurs while trying to use DRM content.

```
// Arguments:
//      [IN] hwndParent - Handle to the window that owns any UI
             elements (windows,
dialog boxes, or message boxes) displayed by this API.
//      [IN] hrError - The HRESULT error to display/handle
//      [IN] pszFileName - The file associated with the error
//      [IN] dwFlags - Flags controlling the API behavior. A
             bitmask comprised of
FDRHF_* flags.
//      [OUT] pdwStatus - Status returned by
             FileDRMHandleError. A bitmask comprised
ofr FDRHF_* flags.
```

The function will only return the following HRESULTS. The application should use SUCCEEDED/FAILED macros to check the return.

```
//      [SUCCESS]
//          S_OK
```

The application may wish to check the FDRHF_RETRY and FDRHF_RIGHTSPENDING bits in *pdwFlags to control additional handling of the error.

```
//      [FAILURE]
//          E_FDRM_ERRORNOTHANDLED
```

An application should handle the error. This will occur either because the FDRM provider cannot handle the error or does not recognize the error. If the user requests a rights renewal, a network connection can be established to send the renewal. Once the response is received a notification will be sent to registered applications.

When an error occurs while using one of the FDRM APIs this FileDrmHandleError API can be called to display error information to the user and (optionally) attempt to correct the error (most likely by offering the user the option to acquire additional rights or extend existing rights via UIs). If the user requests new/updated rights the new/updated rights will arrive asynchronously. If the FDRHF_RETRY flag is set upon return from this function the application may retry the operation that failed.

```
HRESULT FileDrmHandleError    (HWND       hwndParent,
                               HRESULT    hrError,
                               LPCTSTR    pszFileName,
                               DWORD      dwFlags,
                               PDWORD     pdwStatus);
```

Turning now to the FileDrmRenewRights API, its purpose is to renew the rights associated with a DRM protected object.

```
// Arguments:
//      [IN] hwndParent -Handle to the window that owns any UI
             elements (e.g., windows,
dialog boxes, or message boxes) displayed by this API.
//      [IN] pszFileName - Path to the file containing the DRM
             protected object
```

The function is free to return any HRESULT and the application should use the SUCCEEDED/FAILED macros to check the results. In addition, the following HRESULT codes may be returned.

```
//      [SUCCESS]
//          S_FDRM_NOPROVIDER
//          S_FDRM_NOTDRMOBJECT
//      [FAILURE]
//          E_FDRM_NOTALLOWED
//              Rights renewal is not allowed for this object type
```

A rights renewal request can be generated. This may cause a network connection to be opened.

This FileDrmRenewRights API allows an application to renew rights associated with a DRM protected object. In most cases the DRM provider will handle this when FileDrmHandleError is called. New/updated rights can arrive asynchronously.

```
HRESULT FileDrmRenewRights    (HWND hwndParent,
                               LPCTSTR pszFileName);
```

The FileDrmGetMetric function can retrieve metrics related to using DRM protected objects.

```
// Arguments:
//      [IN] drmID - Identifier to select which metric you want.
//      [OUT] pdwMetric -Pointer to a dword variable that will
             hold the metric
```

The function is free to return any HRESULT and the application should use the SUCCEEDED/FAILED macros to check the results. In addition, the following HRESULT codes may be returned.

```
//      [FAILURE]
//          E_FDRM_UNKNOWNMETRIC
HRESULT FileDrmGetMetric (FDRMMETRIC drmID, DWORD
    *pdwMetric);
```

The FileDrmVerifyRights function can allow an application to verify that an object has needed rights before using DRM protected objects.

```
// Arguments:
//      [IN] hwndParent - Handle to the window that owns any UI
            elements (e.g., windows,
dialog boxes, or message boxes) displayed by this API.
//      [IN] pszFileName - Path to the file containing the DRM
            protected object.
//      [IN] dwRight - The right the application wants to use.
            Only one right may be specified.
//      [IN] dwFlags - Flags to control the behavior of
            FDRM_VerifyRights. This is a
bitmask of FDRVF_* flag values.
```

The function is free to return any HRESULT and the application should use the SUCCEEDED/FAILED macros to check the results. In addition, the following HRESULT codes may be returned.

```
//      [SUCCESS]
//          S_FDRM_NOPROVIDER
//          S_FDRM_NOTDRMOBJECT
//      [FAILURE]
//          E_FDRM_FILEDELETED
//          E_FDRM_CANCELLED
//          E_FDRM_LICENSEPENDING
//          E_FDRM_NOTALLOWED
```

In accordance with an aspect, before an application can use a DRM protected object it should call the FileDrmVerifyRights API to ensure that the object can be used as intended. As illustrated in the methodology of FIG. 12, it does this even if it has already called FileDrmGetRights and done its own verification. This API will verify if the object has the appropriate rights, and if necessary, will prompt the user to select at least between consuming rights or renewing expired rights.

```
HRESULT FileDrmVerifyRights   (HWND      hwndParent,
                               LPCTSTR   pszFileName,
                               DWORD     dwRight,
                               DWORD     dwFlags,
                               PDWORD    pdwRightsStatus);
```

The FileDrmVerifyRightsEx API can facilitate an application to verify that an object has needed rights before using DRM protected objects. As described supra, this API can also allow a user to filter content by its intended use.

```
// Arguments:
//      [IN] hwndParent - Handle to the window that owns any UI
            elements (e.g., windows,
dialog boxes, or message boxes) displayed by this API.
//      [IN] pszFileName - Path to the file containing the DRM
            protected object
//      [IN] dwRight - The right the application wants to use.
            Only one right may be specified.
//      [IN] dwFlags - Flags to control the behavior of
            FDRM_VerifyRights. This is a
bitmap of FDRVF_* flag values.
//      [OUT} pdwRightsStatus - Additional information about
            the status of the right
associated with the content. One of the FDRVS_* values.
//              FDRVS_USER_CAN_UPDATE    Right invalid but
                                         user can update
//              FDRVS_UPDATE_PENDING     A rights update is
                                         pending
//              FDRVS_EXPIRABLE          Right is currently
                                         valid but can
expire later.
//      [IN] pGuidFilter - An indication of the intended
            purpose of the content. If the
content pointed to by pszFileName is DRM protected this filter
value is checked as well as the rights associated with the
content to determine if the content can be used.
```

The function is free to return any HRESULT and the application should use the SUCCEEDED/FAILED macros to check the results. In addition, the following HRESULT codes may be returned.

```
//      [SUCCESS]
//          S_FDRM_NOPROVIDER
//          S_FDRM_NOTDRMOBJECT
//      [FAILURE]
//          E_FDRM_FILEDELETED
//          E_FDRM_CANCELLED
//          E_FDRM_LICENSEPENDING
//          E_FDRM_NOTALLOWED
```

In accordance with the exemplary aspect, either this FileDrmVerifyRightsEx API or the FileDrmVerifyRights API is called before an application can use a DRM protected object. The FileDrmVerifyRightsEx API verifies if the object has the appropriate rights, and if necessary, will prompt the user to choose between consuming rights or renewing expired rights.

```
HRESULT FileDrmVerifyRightsEx ( HWND       hwndParent,
                                LPCTSTR    pszFileName,
                                DWORD      dwRight,
                                DWORD      dwFlags,
                                PDWORD     pdwRightsStatus,
                                LPGUID     pguidFilter);
```

Referring now to a description of the FileDrmCommitRights API, a purpose of this API is to facilitate an application that commits the rights used.

```
// Arguments:
//      [IN] hFile - Handle to the file containing the object
            to be used. File should have
been opened using FileDrmCreateFile ( ).
//      [IN] dwRight - The right the application wants to use.
            Only one right may be specified.
```

-continued

```
//      [IN] dwFlags - Flags to control the behavior of
            FileDrmCommitRights. This is a
bitmask of FDRVF_* flag values.
```

The function is free to return any HRESULT and the application should use the SUCCEEDED/FAILED macros to check the results. In addition, the following HRESULT codes may be returned.

```
//      [SUCCESS]
//          S_FDRM_NOPROVIDER
//          S_FDRM_NOTDRMOBJECT
//      [FAILURE]
//          E_FDRM_NOTALLOWED
//          E_FDRM_LICENSEPENDING
```

This FileDrmCommitRights API commits the rights associated with an object. The calling application calls FileDrmVerifyRights before this call.

```
HRESULT FileDrmCommitRights    (HANDLE hFile,
                                DWORD dwRight,
                                DWORD dwFlags);
```

The FileDrmDeleteFile can facilitate deleting a DRM object as well as the associated rights.

```
// Arguments:
//      [IN] pszFileName - Path to the file containing the DRM
            protected object
```

The function is free to return any HRESULT and the application should use the SUCCEEDED/FAILED macros to check the results. In addition, the following HRESULT codes may be returned.

```
//      [SUCCESS]
//          S_FDRM_NOPROVIDER
//          S_FDRM_NOTDRMOBJECT
```

The rights store can be updated and the file containing the object can be deleted. This API deletes both a DRM object and the associated rights.

```
RESULT FileDrmDeleteFile (LPCTSTR pszFileName);
```

Turning now to a discussion of the FileDrmStoreContent API, this API can facilitate reading a file containing MIME-encoded content to be DRM protected and creating the device-locked version of that content, as well as any associated rights or pending rights.

```
// Arguments:
//      [IN] pszInputFileName - Fully qualified path to the file
            containing MIME to be
```

-continued

```
cracked. This file starts with the Content-Type ("Content-type: ...")
optionally preceeded by linear-white-space.
//      [IN] pszOutputFileName - Fully qualified path to the file
            to hold the object
contained within the MIME message.
//      pvReserved - Unused. Should be set to NULL
//      [OUT] pszMimeType - A pointer to the buffer to be filled
            in with the type of the
embedded object ("image/jpeg"). If this pointer is NULL
then this call is to be treated as a request to obtain the size
of the buffer needed to hold the MIME type string.
//      [IN/OUT] pcchMimeTypeLen - A pointer to a DWORD holding
            the length of the
pszMimeType buffer in characters. On entry this value will be
the size of the passed buffer. On exit this will be set to the
length of the MIME type string including the NUL terminator.
```

The function is free to return any HRESULT and the application should use the SUCCEEDED/FAILED macros to check the results. In addition, the following HRESULT codes may be returned.

```
//      [FAILURE]
//          E_FDRM_NOPROVIDER
//          E_INSUFFICIENT_BUFFER
//              Output file not created and *pcchMimeTypeLen
//              updated with needed buffer
        size.
```

In accordance with this API, a new file can be created holding the DRM protected content. As well, the original file can be deleted.

```
HRESULT FileDrmStoreContent    (LPCTSTR pszInputFileName,
                                LPCTSTR pszOutputFileName,
                                PVOID pvReserved,
                                LPTSTR pszMimeType,
                                DWORD *pcchMimeTypeLen);
```

Figure 13:
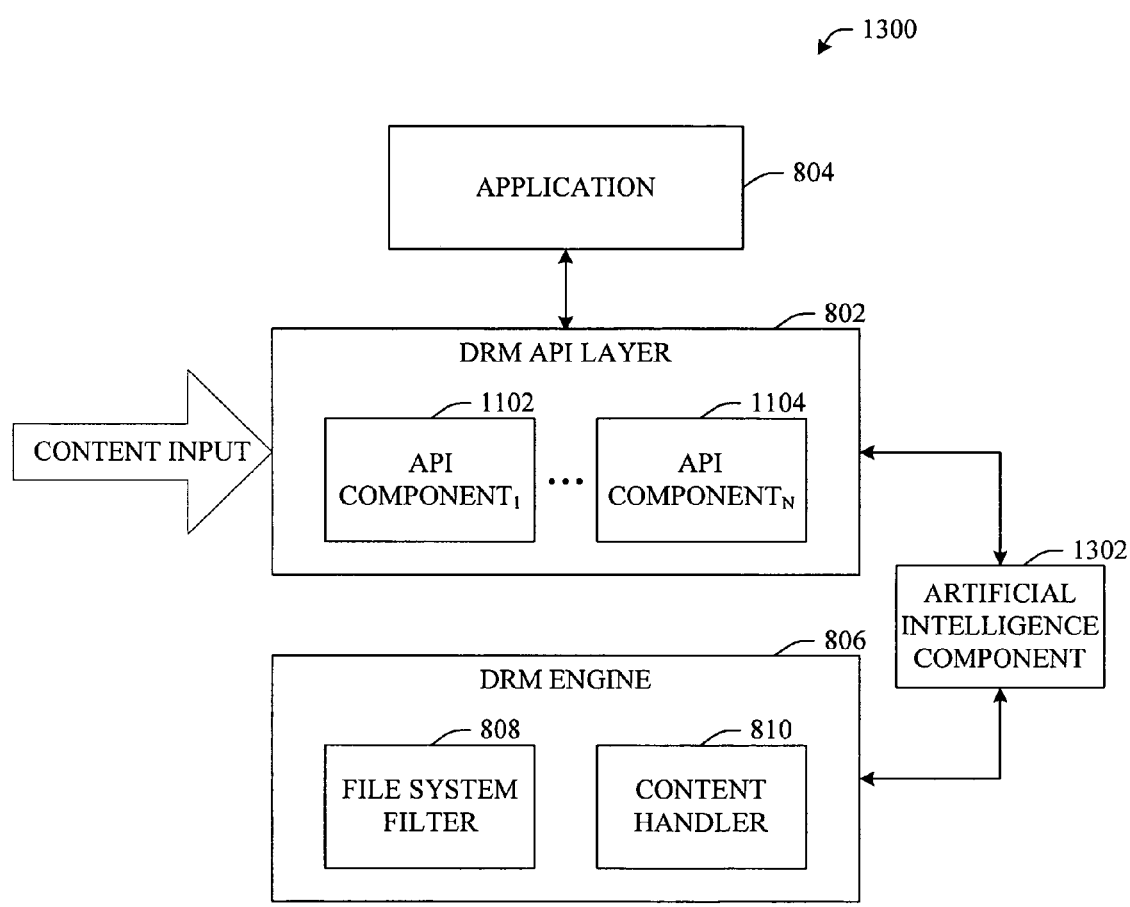
FIG. 13 illustrates an architecture including an artificial intelligence-based component that can automate functionality in accordance with an aspect of the invention.

FIG. 13 illustrates a system 1300 that employs artificial intelligence (AI), which facilitates automating one or more features in accordance with the subject invention. The subject invention (e.g., in connection with verifying rights) can employ various AI-based schemes for carrying out various aspects thereof. For example, a process for determining if rights should be verified, renewed, etc., can be facilitated via an automatic classifier system and process.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. In the case of DRM, for example, attributes can be words or phrases or other data-specific attributes derived from the words (e.g., the presence of key terms), and the classes are categories or areas of interest (e.g., levels of priorities).

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria when and if to obtain, renew or cancel rights.

Figure 14:
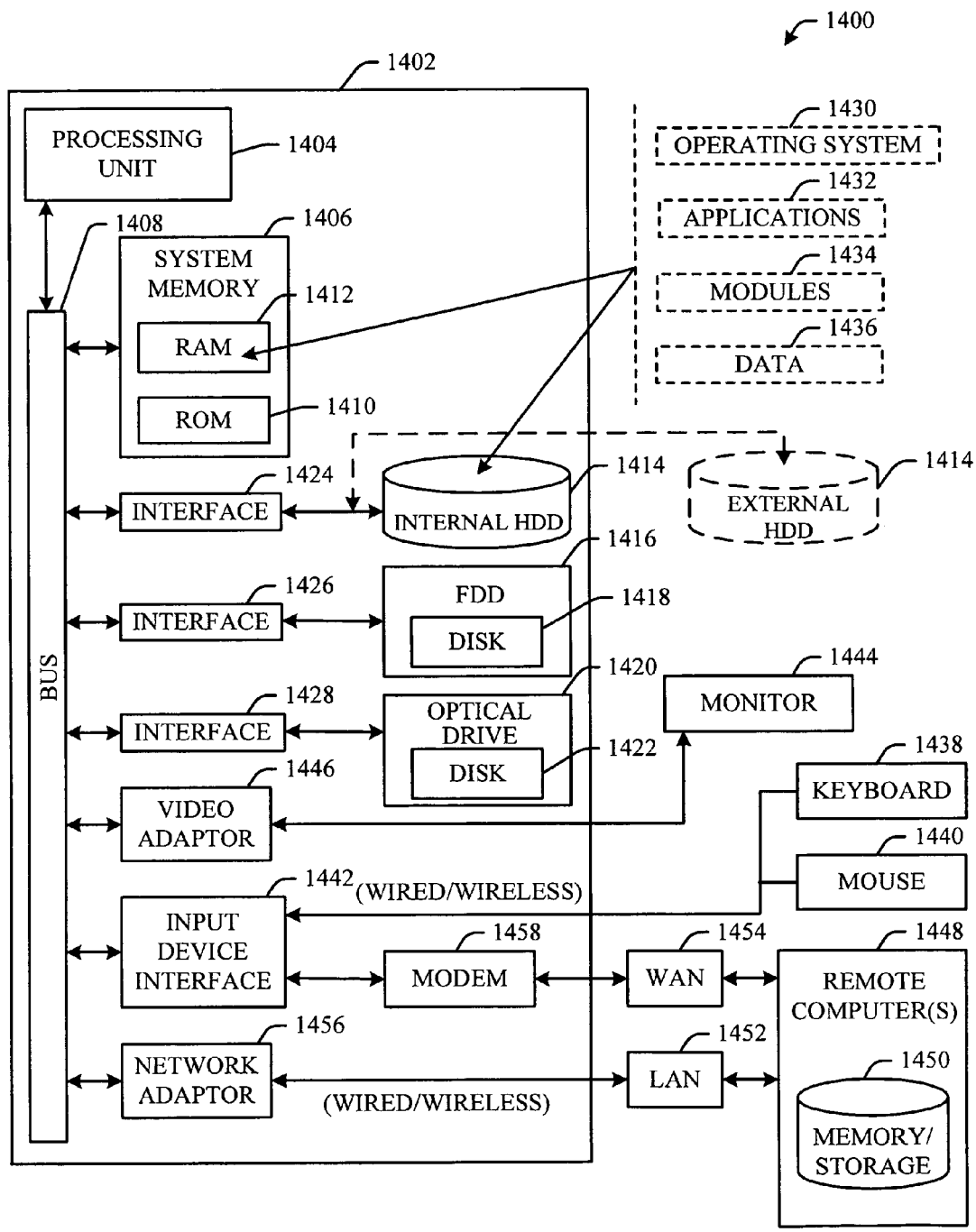
FIG. 14 illustrates a block diagram of a computer operable to execute the disclosed architecture.

Referring now to FIG. 14, there is illustrated a block diagram of a computer operable to execute the disclosed architecture. In order to provide additional context for various aspects of the subject invention, FIG. 14 and the following discussion are intended to provide a brief, general description of a suitable computing environment 1400 in which the various aspects of the invention can be implemented. While the invention has been described above in the general context of computer-executable instructions that may run on one or more computers, those skilled in the art will recognize that the invention also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the invention may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 14, the exemplary environment 1400 for implementing various aspects of the invention includes a computer 1402, the computer 1402 including a processing unit 1404, a system memory 1406 and a system bus 1408. The system bus 1408 couples system components including, but not limited to, the system memory 1406 to the processing unit 1404. The processing unit 1404 can be any of various commercially available processors. Dual microprocessors and other multi-processor architectures may also be employed as the processing unit 1404.

The system bus 1408 can be any of several types of bus structure that may further interconnect to a memory bus (with or without a memory controller), a peripheral bus, and a local bus using any of a variety of commercially available bus architectures. The system memory 1406 includes read-only memory (ROM) 1410 and random access memory (RAM) 1412. A basic input/output system (BIOS) is stored in a non-volatile memory 1410 such as ROM, EPROM, EEPROM, which BIOS contains the basic routines that help to transfer information between elements within the computer 1402, such as during start-up. The RAM 1412 can also include a high-speed RAM such as static RAM for caching data.

The computer 1402 further includes an internal hard disk drive (HDD) 1414 (e.g., EIDE, SATA), which internal hard disk drive 1414 may also be configured for external use in a suitable chassis (not shown), a magnetic floppy disk drive (FDD) 1416, (e.g., to read from or write to a removable diskette 1418) and an optical disk drive 1420, (e.g., reading a CD-ROM disk 1422 or, to read from or write to other high capacity optical media such as the DVD). The hard disk drive 1414, magnetic disk drive 1416 and optical disk drive 1420 can be connected to the system bus 1408 by a hard disk drive interface 1424, a magnetic disk drive interface 1426 and an optical drive interface 1428, respectively. The interface 1424 for external drive implementations includes at least one or both of Universal Serial Bus (USB) and IEEE 1394 interface technologies. Other external drive connection technologies are within contemplation of the subject invention.

The drives and their associated computer-readable media provide nonvolatile storage of data, data structures, computer-executable instructions, and so forth. For the computer 1402, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the invention.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. It is appreciated that the invention can be implemented with various commercially available operating systems or combinations of operating systems.

A user can enter commands and information into the computer 1402 through one or more wired/wireless input devices, e.g., a keyboard 1438 and a pointing device, such as a mouse 1440. Other input devices (not shown) may include a microphone, an IR remote control, a joystick, a game pad, a stylus pen, touch screen, or the like. These and other input devices are often connected to the processing unit 1404 through an input device interface 1442 that is coupled to the system bus 1408, but can be connected by other interfaces, such as a parallel port, an IEEE 1394 serial port, a game port, a USB port, an IR interface, etc.

A monitor 1444 or other type of display device is also connected to the system bus 1408 via an interface, such as a video adapter 1446. In addition to the monitor 1444, a computer typically includes other peripheral output devices (not shown), such as speakers, printers, etc.

The computer 1402 may operate in a networked environment using logical connections via wired and/or wireless communications to one or more remote computers, such as a remote computer(s) 1448. The remote computer(s) 1448 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1450 is illustrated. The logical connections depicted include wired/wireless connectivity to a local area network (LAN) 1452 and/or larger networks, e.g., a wide area network (WAN) 1454. Such LAN and WAN networking environments are commonplace in offices and companies, and facilitate enterprise-wide computer networks, such as intranets, all of which may connect to a global communications network, e.g., the Internet.

When used in a LAN networking environment, the computer 1402 is connected to the local network 1452 through a wired and/or wireless communication network interface or adapter 1456. The adaptor 1456 may facilitate wired or wireless communication to the LAN 1452, which may also include a wireless access point disposed thereon for communicating with the wireless adaptor 1456.

When used in a WAN networking environment, the computer 1402 can include a modem 1458, or is connected to a communications server on the WAN 1454, or has other means for establishing communications over the WAN 1454, such as by way of the Internet. The modem 1458, which can be internal or external and a wired or wireless device, is connected to the system bus 1408 via the serial port interface 1442. In a networked environment, program modules depicted relative to the computer 1402, or portions thereof, can be stored in the remote memory/storage device 1450. It will be appreciated that the network connections shown are exemplary and other means of establishing a communications link between the computers can be used.

The computer 1402 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 15:
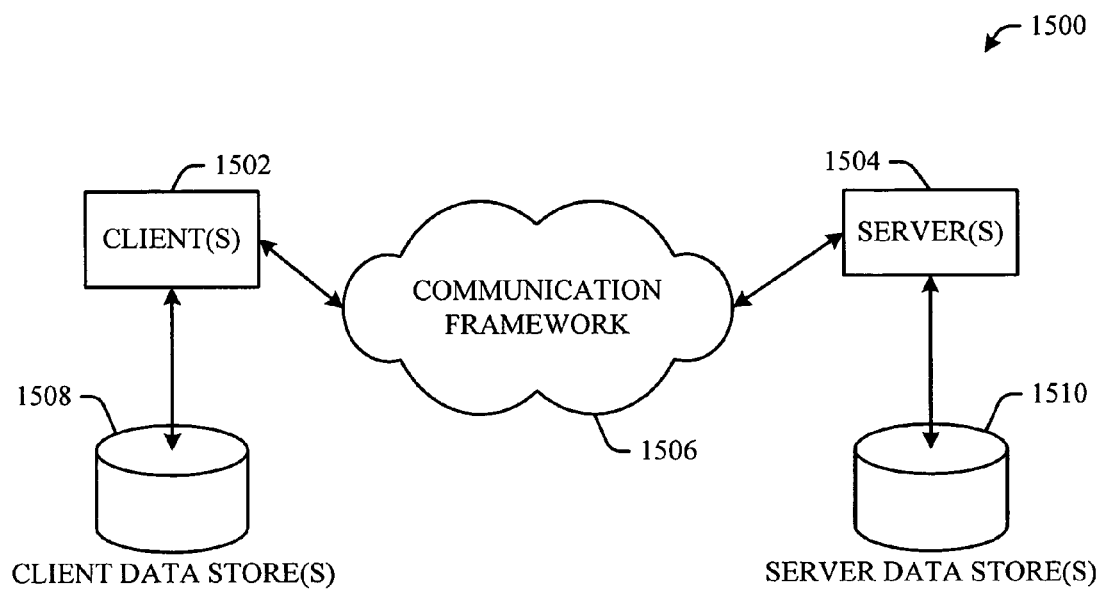
FIG. 15 illustrates a schematic block diagram of an exemplary computing environment in accordance with the subject invention.

Referring now to FIG. 15, there is illustrated a schematic block diagram of an exemplary computing environment 1500 in accordance with the subject invention. The system 1500 includes one or more client(s) 1502. The client(s) 1502 can be hardware and/or software (e.g., threads, processes, computing devices). The client(s) 1502 can house cookie(s) and/or associated contextual information by employing the invention, for example.

The system 1500 also includes one or more server(s) 1504. The server(s) 1504 can also be hardware and/or software (e.g., threads, processes, computing devices). The servers 1504 can house threads to perform transformations by employing the invention, for example. One possible communication between a client 1502 and a server 1504 can be in the form of a data packet adapted to be transmitted between two or more computer processes. The data packet may include a cookie and/or associated contextual information, for example. The system 1500 includes a communication framework 1506 (e.g., a global communication network such as the Internet) that can be employed to facilitate communications between the client(s) 1502 and the server(s) 1504.

Communications can be facilitated via a wired (including optical fiber) and/or wireless technology. The client(s) 1502 are operatively connected to one or more client data store(s) 1508 that can be employed to store information local to the client(s) 1502 (e.g., cookie(s) and/or associated contextual information). Similarly, the server(s) 1504 are operatively connected to one or more server data store(s) 1510 that can be employed to store information local to the servers 1504.

What has been described above includes examples of the invention. It is, of course, not possible to describe every conceivable combination of components or methodologies for purposes of describing the subject invention, but one of ordinary skill in the art may recognize that many further combinations and permutations of the invention are possible. Accordingly, the invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-readable medium having stored thereon computer-executable instructions that when executed by a computing system facilitate the management of digital rights management (DRM) content, the computer-executable instructions comprising:

instructions implementing a pluggable file-based DRM application program interface (API) layer that facilitates an application to manage the DRM content, the API layer comprising a plurality of DRM API's, each DRM API adapted to communicate with a separate DRM engine; and instructions implementing a DRM engine that communicates with the pluggable file-based API, the DRM engine facilitating use of the DRM content via the application using one of the plurality of DRM API's, wherein the DRM engine supplies a user interface (UI) that allows the application to use an engine-specific feature.

2. The computer-readable medium of claim 1, the pluggable file-based DRM API layer facilitating opening a file containing the DRM content and verifying a DRM right associated with an intended use of the content.

3. The computer-readable medium of claim 2, the pluggable file-based API layer facilitating determining if the file includes DRM protected content.

4. The computer-readable medium of claim 2, the pluggable file-based API layer facilitating committing the DRM right used by the DRM content.

5. The computer-readable medium of claim 1, the pluggable file-based API layer facilitating prompting the DRM engine to display a user interface to handle an error.

6. The computer-readable medium of claim 5, wherein the error is an invalid right.

7. The computer-readable medium of claim 5, wherein the error is an expired right.

8. The computer-readable medium of claim 1, wherein the DRM engine is content agnostic.

9. The computer-readable medium of claim 1, wherein the DRM engine comprises a filter component that receives a request from the pluggable file-based DRM API and facilitates filtering of the DRM content based upon an intended use.

10. The computer-readable medium of claim 1, wherein the pluggable file-based DRM API is a stub that calls into an API layer of the DRM engine.

11. The computer-readable medium of claim 1, fun her comprising an artificial intelligence component that employs an analysis to prognose an action that a user desires to be automatically performed.

* * * * *

UNITED STATES PATENT AND TRADEMARK OFFICE
CERTIFICATE OF CORRECTION

| | | |
|---|---|---|
| PATENT NO. | : 7,698,223 B2 | Page 1 of 1 |
| APPLICATION NO. | : 11/111651 | |
| DATED | : April 13, 2010 | |
| INVENTOR(S) | : Andrew D. Padawer et al. | |

It is certified that error appears in the above-identified patent and that said Letters Patent is hereby corrected as shown below:

In column 30, line 18, in Claim 11, delete "fun her" and insert -- further --, therefor.

Signed and Sealed this
Twenty-fifth Day of January, 2011

David J. Kappos
*Director of the United States Patent and Trademark Office*